(12) United States Patent
McGuire, Jr.

(10) Patent No.: US 7,330,615 B2
(45) Date of Patent: *Feb. 12, 2008

(54) WAVELENGTH SELECTIVE OPTICAL SWITCH

(75) Inventor: James P. McGuire, Jr., Pasadena, CA (US)

(73) Assignee: Optical Research Associates, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/646,864

(22) Filed: Dec. 28, 2006

(65) Prior Publication Data

US 2007/0104418 A1 May 10, 2007

Related U.S. Application Data

(60) Division of application No. 11/399,215, filed on Apr. 6, 2006, now abandoned, which is a continuation of application No. 10/460,899, filed on Jun. 12, 2003, now Pat. No. 7,058,251.

(60) Provisional application No. 60/388,358, filed on Jun. 12, 2002, provisional application No. 60/397,944, filed on Jul. 23, 2002.

(51) Int. Cl.
*G02B 6/26* (2006.01)

(52) U.S. Cl. .................. 385/16; 385/24; 385/566; 385/290

(58) Field of Classification Search ............ None
See application file for complete search history.

(56) References Cited

U.S. PATENT DOCUMENTS

| 4,244,045 A | 1/1981 | Nosu et al. |
|---|---|---|
| 4,482,994 A | 11/1984 | Ishikawa |
| 4,768,849 A | 9/1988 | Hicks, Jr. |
| 4,998,793 A | 3/1991 | Henry et al. |
| 5,040,169 A | 8/1991 | Guerin et al. |
| 5,048,909 A | 9/1991 | Henry et al. |
| 5,414,540 A | 5/1995 | Patel et al. |
| 5,652,814 A | 7/1997 | Pan et al. |
| 5,745,271 A | 4/1998 | Ford et al. |
| 5,786,915 A | 7/1998 | Scobey |
| 5,822,095 A | 10/1998 | Taga et al. |
| 5,859,717 A | 1/1999 | Scobey et al. |

(Continued)

FOREIGN PATENT DOCUMENTS

CA    2342719    5/2002

(Continued)

OTHER PUBLICATIONS

Scobey et al., Hybrid thin film WDM and optical switch devices for optical add/drop, Optical Fiber Conference, 2000, Conference Paper, WM42-3.

*Primary Examiner*—Fayez G. Assaf
(74) *Attorney, Agent, or Firm*—Knobbe Martens Olson & Bear

(57) ABSTRACT

A wavelength selective optical switch particularly usable as a programmable N×M optical switch in a multi-wavelength communication system. The switch uses a grating that separates multi-channel optical signals into a plurality of optical channels, and combines a plurality of optical channels into multi-channel optical signals. Programmable mirrors switch each optical channel to any of a plurality of fibers coupled to the switch.

18 Claims, 11 Drawing Sheets

U.S. PATENT DOCUMENTS

| | | |
|---|---|---|
| 5,881,199 A | 3/1999 | Li |
| 5,912,748 A | 6/1999 | Wu et al. |
| 5,943,454 A | 8/1999 | Aksyuk et al. |
| 5,960,133 A | 9/1999 | Tomlinson |
| 6,097,859 A | 8/2000 | Solgaard et al. |
| 6,185,023 B1 | 2/2001 | Mizrahi |
| 6,198,857 B1 | 3/2001 | Grasis et al. |
| 6,204,946 B1 | 3/2001 | Aksyuk et al. |
| 6,208,442 B1 | 3/2001 | Liu et al. |
| 6,212,312 B1 | 4/2001 | Grann et al. |
| 6,263,134 B1 | 7/2001 | Laude |
| 6,275,623 B1 | 8/2001 | Brophy et al. |
| 6,285,500 B1 | 9/2001 | Ranalli et al. |
| 6,285,810 B1 | 9/2001 | Fincato et al. |
| 6,289,145 B1 | 9/2001 | Solgaard et al. |
| 6,320,996 B1 | 11/2001 | Scobey et al. |
| 6,327,019 B1 | 12/2001 | Patel et al. |
| 6,351,581 B1 | 2/2002 | Doerr et al. |
| 6,407,839 B1 | 6/2002 | Cao |
| 6,434,291 B1 | 8/2002 | Kessler et al. |
| 6,439,728 B1 | 8/2002 | Copeland |
| 6,498,872 B2 | 12/2002 | Bouevitch et al. |
| 6,501,877 B1 | 12/2002 | Weverka et al. |
| 6,535,664 B1 | 3/2003 | Anderson |
| 6,542,657 B2 | 4/2003 | Anderson |
| 6,549,699 B2 | 4/2003 | Belser et al. |
| 6,560,000 B2 | 5/2003 | Iyer et al. |
| 6,560,020 B1 | 5/2003 | Kramer |
| 6,625,346 B2 | 9/2003 | Wilde |
| 6,631,222 B1 | 10/2003 | Wagener et al. |
| 6,634,810 B1 | 10/2003 | Ford et al. |
| 6,636,654 B2 | 10/2003 | McGuire, Jr. |
| 6,657,770 B2 | 12/2003 | Marom et al. |
| 6,678,445 B2 | 1/2004 | Tomlinson et al. |
| 6,707,959 B2 | 3/2004 | Ducellier et al. |
| 6,751,415 B1 | 6/2004 | Fabiny |
| 6,785,038 B2 | 8/2004 | Hichwa et al. |
| 6,798,941 B2 | 9/2004 | Smith et al. |
| 7,019,885 B2 | 3/2006 | Michalicek |
| 7,058,251 B2 * | 6/2006 | McGuire, Jr. ................ 385/16 |
| 2001/0009596 A1 | 7/2001 | Solgaard et al. |
| 2001/0052980 A1 | 12/2001 | Tada |
| 2002/0076146 A1 | 6/2002 | Iyer et al. |
| 2002/0131698 A1 | 9/2002 | Wilde |
| 2002/0196493 A1 | 12/2002 | Marom |
| 2002/0196494 A1 | 12/2002 | McGuire, Jr. |
| 2002/0196520 A1 | 12/2002 | Marom et al. |
| 2002/0197000 A1 | 12/2002 | Marom |
| 2003/0012486 A1 | 1/2003 | Ducellier et al. |
| 2003/0053749 A1 | 3/2003 | Weverka et al. |
| 2004/0130774 A1 | 7/2004 | Giles et al. |

FOREIGN PATENT DOCUMENTS

EP    1001287 A2    5/2000

* cited by examiner

WAVELENGTH SELECTIVE OPTICAL SWITCH

RELATED APPLICATION

This application is a divisional of prior U.S. application Ser. No. 11/399,215, filed Apr. 6, 2006 now abandoned, which is a continuation of prior U.S. application Ser. No. 10/460,899, filed Jun. 12, 2003 now U.S. Pat. No. 7,058,251, the entire contents of which are hereby incorporated by reference herein and made a part of this specification, and claims the benefit of U.S. Provisional Application Nos. 60/388,358 filed Jun. 12, 2002, and 60/397,944 filed Jul. 23, 2002, the disclosures of which are also incorporated fully herein by reference.

FIELD OF THE INVENTION

This invention relates to the field of optical communications, and more particularly, to a wavelength selective optical switch for use in optical multiplexing.

BACKGROUND OF THE INVENTION

For several decades, fiber optics have been used for communication. Specifically, fiber optics are used for data transmission and other telecommunication applications. Despite the enormous information carrying capacity of fiber, as compared to conventional copper cable, the high cost of installing fiber optics presents a barrier to full implementation of fiber optics, particular as the "last mile", from the central office to residences and businesses.

One method of increasing carrying capacity without incurring additional installation costs has been to multiplex multiple signals onto a single fiber using various methods, such as time division multiplexing, where two or more different signals are carried over the same fiber, each sharing a portion of time. Another more preferred multiplexing method is wavelength division multiplexing (WDM), where two or more different wavelengths of light are simultaneously carried over a common fiber.

Wavelength division multiplexing can separate a fiber's bandwidth into multiple channels. Dividing bandwidth into multiple discreet channels, such as 8, 16, 40, or even as many as 160 channels, through a technique referred to as dense channel wavelength division multiplexing (DWDM), is a relatively lower cost method of substantially increasing telecommunication capacity, using existing fiber optic transmission lines. Techniques and devices are required, however, for multiplexing the different discreet carrier wavelengths. That is, the individual optical signals must be combined onto a common fiber-optic line or other optical waveguide and then later separated again into the individual signals or channels at the opposite end or other point along the fiber-optic cable. Thus, the ability to effectively combine and then separate individual wavelengths (or wavelength sub-ranges) is of growing importance to the fiber-optic telecommunications field and other fields employing optical instruments.

Optical multiplexers are known for use in spectroscopic analysis equipment and for the combination or separation of optical signals in wavelength division multiplexed fiber-optic telecommunications systems. Known devices for this purpose have employed, for example, diffraction gratings, prisms and various types of fixed or tunable filters.

Approaches for selectively removing or tapping a channel, i.e., selective wavelengths, from a main trunk line carrying multiple channels, i.e., carrying optical signals on a plurality of wavelengths or wavelength sub-ranges, is suggested, for example, in U.S. Pat. No. 4,768,849 to Hicks, Jr. Hicks, shows filter taps, as well as the use of gangs of individual filter taps, each employing high performance, multi-cavity dielectric pass-band filters and lenses for sequentially removing a series of wavelength sub-ranges or channels from a main trunk line. The filter tap of Hicks, returns a multi-channel signal to the main trunk line as it passes the desired channel to a branch line. One known demux is disclosed in Pan et al., U.S. Pat. No. 5,652,814, FIG. 25. In Pan et al., the WDM input signal is cascaded through individual filter assemblies, consisting of a fiber collimator, thin film filter, and a fiber-focusing lens. Each filter is set for a given wavelength. However, aligning the fibers for each wavelength is costly and errors in the alignment contribute significantly to the system losses. Further, FIG. 13 of Pan et al. teaches the use of a dual fiber collimator, thin film filter, and a dual fiber focusing lens to selectively DROP and ADD a single wavelength or range of wavelengths. As discussed above, aligning the collimators is expensive.

Polarization dependent loss (PDL) is also a problem in WDM system because the polarization of the light drifts as it propagates through the fiber and furthermore this drift changes over time. Thus, if there is PDL in any component, the drifting polarization will change the signal level, which may degrade the system operation.

Other multiplexer devices may be employed to add or drop channels in WDM systems. These systems are commonly known as optical add/drop multiplexers, or OADM. Another OADM, disclosed by Mizrahi in U.S. Pat. No. 6,185,023, employs fiber Bragg gratings to demux and mux signals in a WDM system. This method requires optical circulators and multiple components.

However, the multi channel OADM designs discussed above are not programmable by the end user. That is, each multiplexer is designed and manufactured to mux (add) specific channels; or when used in reverse each multiplexers is also designed and manufactured to demux (drop) specific channels. This limitation mandates that the optical system's parameters be fixed before installation. Changes are not possible without replacing the fixed optical multiplexers with different designed multiplexers. This is expensive.

One known programmable OADM is discussed in Boisset et al, International Publication No. WO01/13151. In Boisset et al., the desired add/drop channel is programmed by translating a segmented filter. To achieve this translation however, a large mechanical mechanism is employed. A further limitation to Boisset et al. is that only a single channel may be added or dropped per device. Designers may employ multiple devices, deployed in series, and programmed as necessary to add/drop the correct channel; however, this approach requires multiple devices and has multiple points of failure. Furthermore, the size of such a device would be overly large and therefore not practical for many applications where space is limited.

An OADM disclosed by Patel et al., U.S. Pat. No. 5,414,540 uses bulk gratings to demultiplex and multiplex WDM input and output signal and compact liquid crystal switches. Because the device uses polarization to switch the light path, the arbitrarily polarized incident beam must be converted into a singular polarization prior to switching by the liquid crystal. Patel teaches the use of a birefringent crystal and a Wollaston prism to separate the incident beam into two polarizations state located between the focusing lens and the liquid crystal. While the OADM disclosed by Patel is relatively compact; it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system. A 2×2 switch has four sub beams incident on the liquid crystal (because of the conversion from an arbitrary polarized beam to a single polarization for the liquid crystal switch) and four sub beams leaving the liquid crystal. Thus, the aperture of the lens focusing the light on the grating must be a minimum of 4× larger than that required for a single sub beam in one polarization.

An OADM disclosed by Ranalli et al., U.S. Pat. No 6,285,500, that uses bulk gratings to demultiplex and multiplex WDM input and output signal and compact liquid crystal switches. Because the device uses polarization to switch the light path, the arbitrarily polarized incident beam must be converted into a singular polarization prior to switching by the liquid crystal. Ranalli teaches the use of half-wave plates and a thin film polarization beamsplitter located before the lens that focuses light onto the liquid crystal. Because of the optical arrangement, the aperture of the lens focusing the light on the grating must be a minimum of 2× larger than that required for a single sub beam in one polarization. While the OADM disclosed by Ranalli is relatively compact; it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system.

A OADM disclosed by Patel et al., U.S. Pat. No. 6,327,019, uses bulk gratings to demultiplex and multiplex WDM input and output signal and compact liquid crystal switches. The OADM disclosed by Patel provides for dual 2×2 switching for each wavelength. There are two Input and two Add channels that may be selectively sent to either the two Output or two Drop channels. If higher dimensionality switching is required, then additional components are required. The additional components require additional space, add attenuation, and add cost to the system. Because liquid crystals use polarization to switch the light path, the arbitrarily polarized incident beam must be converted into a singular polarization prior to switching, which doubles the required aperture of the lens. Thus, the dual 2×2 switch has eight sub beams incident on the liquid crystal and eight sub beams leaving the liquid crystal. Thus, the aperture of the lens focusing the light on the grating must be a minimum of 8× larger than the aperture required for single incident beam in one polarization.

An OADM disclosed by Aksyuk, et al, U.S. Pat. No. 6,204,946 uses a bulk grating to demultiplex and multiplex WDM input and output signal and Micro Electrical Mechanical Systems (MEMS) to provide the switching. This is another relatively compact switch, but it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system. Because Aksyuk uses circulators to separate the Input and Add channels from the Output and Drop channels, the aperture of the lens focusing the light on the grating must be a minimum of 2× larger than the of a single incident beam.

Another known programmable OADM is discussed Tomlinson, U.S. Pat. No. 5,960,133, uses a bulk gratings to demultiplex and multiplex WDM input and output signal, and MEMS mirrors to switch. The OADM disclosed by Tomlinson is programmable and provides for dual 2×2 switching. Tomlinson teaches a switch that does not require the use of circulators, potentially increasing the system efficiency. However, the aperture of the lens focusing the light on the grating must be a minimum of (1+Sqrt[2])× larger than the of a single incident beam for a 2×2 switch. Furthermore, for a dual 2×2 without circulators, the aperture of the lens focusing the light on the grating must be a minimum of Sqrt[10]× larger than that of a single incident beam. Thus, the size and expense of the focusing lens required grows quickly when moving from a single to dual switching.

A programmable optical multiplexer/demultiplexer, disclosed by Marom et al, in US Pat. App. 02/0196520, independently assigns every input optical channel in a signal to depart from any desired output port, which provides the functionality of 1×N switching for every wavelength. Marom teaches the use of a bulk grating to multiplex/demultiplex WDM input and output signal, and MEMS mirrors to switch. The demultiplexer device can also be operated in the reverse direction, and thus achieve programmable optical multiplexer functionality. However, the size and expense of the lens required by the demultiplexer also grows linearly with port count. A 1×5 port programmable optical multiplexer/demultiplexer requires a lens to focus light on the MEMs mirrors with an aperture at least 5× as large as that of a single incident beam.

Optical gratings are a periodic structure, which diffract light according to the wavelength. They can be used in either reflection or transmission. Gratings can be produce by modulating the surface height of a substrate or by modulating the index of refraction of a structure.

The spectral resolving power, $R=\lambda/\Delta\lambda$, of a grating is a measure of its ability to separate adjacent spectral lines, where A is average wavelength of a line and $\Delta\lambda$ is the limit of resolution. The theoretical resolving power is $$R=Nd \cos \Gamma(\sin \alpha + \sin \beta)/\lambda$$

where N is the number of groves, d is the groove spacing, $\Gamma$ is the angle between the incident light path and the plane perpendicular to the groves, $\alpha$ is the angle of incidence on the grating and $\beta$ is the angle of diffraction. If the grating is planar and the groove spacing is uniform, then the resolving power is proportional to the ruled with of the grating, N d. Spectral resolving power is an important design parameter; the greater the resolving power the greater the optical separation between channels, and ultimately the channels a grating-based system can accommodate. For low-loss transmission of OC-768 channels and a channel spacing of 100 GHz, it is preferred that the resolution be 20 GHz or finer.

Of course, a larger grating can be employed to increase the spectral resolving power, however, that requires a combination of more physical space and faster or longer focal length lenses that are more expensive. Another approach has been to decrease the spacing of the grating grooves, d. However, the maximum theoretical efficiency of the grating decreases for small groove separations. When the separations between the grooves spacing is comparable to the wavelength of light, it is possible to get gratings that operate with high efficiency (>90%) for any incident polarization state. As the groove spacing approaches half the wavelength of light, it is possible to get high efficiency for only light polarized parallel to the grooves. For even smaller grooves separations, it is not possible to get high efficiency in either polarization state. Thus, there is a practical limit to increasing spectral resolving power through decreased grating groove separations. The relationship between grating efficiency, polarization, and groove shape is well known in the art and described in Diffraction Grating Handbook, Ch. 9, 4th Ed, Richardson Grating Laboratory, C. Palmer, (2000), which is hereby incorporated by reference. Each bulk diffraction grating device requires a minimum number of grating grooves to achieve a given spectral resolution. The minimum size is determined by the optical configuration of the device and the grating parameters.

One desired application for optical multiplexing and demultiplexing systems is in optical wavelength switch. An optical wavelength switch demultiplexes optical signals, switches the signals, and then and multiplexes to a plurality of optical ports.

The ability to switch to a number of optical ports in wavelength switches introduces another limiting design factor. In order to switch to a number of physical ports the size of the device must not only accommodate the space needed for the ports, but the optics must also direct the optical signals to those ports. As the number of ports increases the optical directing means (typically a moveable mirror) must be capable of directing the optical beams across a larger physical area where the optical ports are located. Also, as the optical beams must exit the ports within an acceptance angle so as to be coupled into the optical fiber, the ports must be physically located within a certain placement angle from the directing means. As the placement angle increases, the optical directing means generally becomes more expensive and the insertion loss increases. An additional lens may be used to focus the beam—however, this adds component cost and size to the device.

If the optical beams inside the device are made larger so as to increase spectral resolution the device size must increase, and in some cases larger lenses must be used. For example, an optical switch of the type disclosed by Marom et al. US 2002/0196520 A1, with one input port and four output ports (1×4) might be capable of switching 64 wavelengths spaced at 100 GHz. If the same design were used to switch 16 ports the grating and the grating aperture would likely need to be 4× larger to accommodate 100 GHz channels or if the grating was the same size, the system could switch 16 wavelength channels spaced at 400 GHz. The device disclosed by Marom cannot provide adequate spectral resolution for a large number of ports and a large number of wavelengths using small compact lenses that are easy to manufacture.

An optical wavelength switch disclosed by Waverka et al. WO 01/37021 uses a bulk diffraction grating and MEMS mirrors to provide 1×N switching. However, this design has a major drawback. Because the image is translated at the spectral focal plane by the MEMS mirrors, the incident angle on the grating changes with switch position, which in turn changes the angular dispersion provided by the grating. Thus, the device is unable to achieve adequate spectral resolution for a large number of ports and a large number of wavelengths with low losses. Waverka also teaches the use of cylindrical optics to produce an elliptical beam that minimizes the size of the grating. However, because the cylindrical optics are used symmetrically to both collimate light for the grating and to focus the light on the switch array, the footprint of the optical beam at the switch is a very high aspect ratio ellipse. Thus, very long thin, hard to fabricate switches are required.

It is an object of the present invention to provide improved optical switching that reduce or wholly overcome some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY OF THE INVENTION

In accordance with a first aspect of the invention, a wavelength selective optical switch, can establish a reconfigurable connection between any two fibers from a plurality of fibers in a fiber array, independently for each optical wavelength that enters the switch. One of a plurality of cylindrical lenses receives a first multi-channel optical signal from an optically coupled fiber in the array, the first multi-channel optical signal is directed through an anamorphic lens to a grating. The grating diffracts the first multi-channel optical signal according to the wavelengths of each individual optical channel, and directs each channel through a rotationally symmetric lens that focuses the individual optical channels near one of a plurality of programmable mirrors. Each mirror is associated with a particular individual optical channel. Depending upon the programmed state of the mirror, the individual optical channel is directed to any one of the fibers in the fiber array by way of the rotationally symmetric lens, the grating, the anamorphic lens, and one of the plurality of cylindrical lenses. By changing the programmed state of the mirror, the individual optical channel may be switched to any of the fibers in the fiber array.

The invention may be used as a programmable optical demultiplexer, wherein one of the plurality of cylindrical lenses receives a first multi-channel optical signal from an optically coupled fiber in the array, the first multi-channel optical signal is directed through the anamorphic lens to the grating. The grating diffracts the first multi-channel optical signal according to the wavelengths of each individual optical channel, and directs each channel through a rotationally symmetric lens that focuses the individual optical channels near one of a plurality of programmable mirrors. Each mirror is associated with a particular individual optical channel. Depending upon the programmed state of the mirrors, individual optical channels are directed to any one of the fibers in the fiber array by way of the rotationally symmetric focusing lens, the grating, the anamorphic lens, and one of the plurality of cylindrical lenses. By changing the programmed state of the mirrors, any of the individual optical channels may be switched to any of the fibers in the fiber array. Further, in the case where two or more of the individual optical channels are switched to a single fiber, upon illuminating the grating the two or more individual optical channels are multiplexed into a second multi-channel light signal.

The device may also be operated in the "opposite direction" as a programmable multiplexer; that is two or more of the plurality of cylindrical lenses each receives one or more different individual optical channels from optically coupled fibers in the array, the individual optical channels are directed through the anamorphic lens to the grating. The grating diffracts the first multi-channel optical signal according to the wavelengths of each individual optical channel, and directs each channel through a rotationally symmetric lens that focuses the individual optical channels near one of a plurality of programmable mirrors. Each mirror is associated with a particular individual optical channel. Each of the mirrors is programmed to reflect each of the individual optical channels to any one of the fibers in the fiber array by way of the rotationally symmetric focusing lens, the grating, the anamorphic lens, and one of the plurality of cylindrical lenses. By changing the programmed state of the mirrors, all of the individual optical channels may be switched to any of the fibers in the fiber array.

In accordance with the first aspect of the invention, the programmed state of the mirrors is such that a mirror connection may be established at any place along the fiber array. In this regard, the device can be programmed to establish optical connectivity, for each optical channel, between any of the fibers in the array. That is the device can operate as an N×1×M switch; directing N unique individual optical channels received from one fiber in a fiber array to any of the M fibers in the fiber array.

The device may also direct two or more individual optical channels centered at the same wavelength and received from two or more fibers in the fiber array to other fibers in the array. However, the switching matrix is more restrictive as the same mirror is used for the direction of all the individual optical channels centered at the same wavelength. In this manner, each of the individual optical channels centered at the same wavelength are directed to the fiber in the fiber array that is opposite the mirror's connection. For example, consider a nine port device coupled to a nine fiber array (the consecutive fibers numbered 1 through 9) which receives a first individual optical channel centered at wavelength x on port 1, and receives a second individual optical channel centered at wavelength x on port 2. If the corresponding mirror connection for wavelength x is set such that the light at wavelength x entering the switch from fiber 3 also leaves from fiber 3, then the first individual optical channel at wavelength x will be directed to fiber 5, and the second at wavelength x to fiber 4. In this manner, the device does not operate as an N×1×M switch, but still provides numerous switching options. Such options will be clear to one skilled in the art.

In accordance with a second aspect of the invention, a wavelength selective optical switch, can establish a reconfigurable connection between any two fibers from a plurality of fibers in a fiber array, independently for each optical wavelength that enters the switch. One of a plurality of cylindrical lenses receives a first multi-channel optical signal from an optically coupled fiber in the array, the first multi-channel optical signal is directed through an anamorphic lens, to a beam splitter. The beam splitter separates light that is s-polarized from light that is p-polarized, and directs both out of the beam splitter through a first and second quarter waveplate. The s-polarized light illuminates a first grating, and the p-polarized light illuminates a second grating. The gratings diffract the respective s-polarized and p-polarized first multi-channel optical signal according to the wavelengths of each individual optical channel, and direct the respective s-polarized and p-polarized light of each individual optical channel back through the quarter waveplate into the beam splitter, which recombines the s-polarized and p-polarized light of each channel and directs the individual optical channels through a rotationally symmetric lens that focuses the individual optical channels near one of a plurality of programmable mirrors. Each mirror is associated with a particular individual optical channel. Depending upon the programmed state of the mirror, the individual optical channel is directed to any one of the fibers in the fiber array by way of the rotationally symmetric lens, the beam splitter, waveplates and gratings, the beam splitter, anamorphic lens, and one of the plurality of cylindrical lenses. By changing the programmed state of the mirror, the individual optical channel may be switched to any of the fibers in the fiber array.

The device may also be operated in the "opposite direction" as a programmable multiplexer; that is two or more of the plurality of cylindrical lenses each receives one or more different individual optical channels from optically coupled fibers in the array, the individual optical channels are directed through the anamorphic lens to the beam splitter. The beam splitter separates the s-polarized and p-polarized states and directs each to the first and second gratings. The gratings diffracts the first multi-channel optical signal according to the wavelengths of each individual optical channel, and directs each channel back through the beam splitter recombining the s-polarized and p-polarized states, and directing the individual optical channel through the rotationally symmetric lens that focuses the individual optical channels near one of a plurality of programmable mirrors. Each mirror is associated with a particular individual optical channel. Each of the mirrors is programmed to reflect each of the individual optical channels to any one of the fibers in the fiber array. By changing the programmed state of the mirrors, all of the individual optical channels may be switched to any of the fibers in the fiber array.

In accordance with the second aspect of the invention, the programmed state of the mirrors is such that a mirror connection may be established at any place along the fiber array. In this regard, the device can be programmed to establish optical connectivity, for each optical channel, between any of the fibers in the array. That is the device can operate as an N×1×M switch; directing N unique individual optical channels received from one fiber in a fiber array to any of the M fibers in the fiber array.

The device may also direct two or more individual optical channels centered at the same wavelength and received from two or more fibers in the fiber array to other fibers in the array. However, the switching matrix is more restrictive as the same mirror is used for the direction of all the individual optical channels centered at the same wavelength. In this manner, each of the individual optical channels centered at the same wavelength are directed to the fiber in the fiber array that is opposite the mirror's connection. For example, consider a nine port device coupled to a nine fiber array (the consecutive fibers numbered 1 through 9) which receives a first individual optical channel centered at wavelength x on port 1, and receives a second individual optical channel centered at wavelength x on port 2. If the corresponding mirror connection for wavelength x is set such that the light at wavelength x entering the switch from fiber 3 also leaves from fiber 3, then the first individual optical channel at wavelength x will be directed to fiber 5, and the second at wavelength x to fiber 4. In this manner, the device does not operate as an N×1×M switch, but still provides numerous switching options. Such options will be clear to one skilled in the art.

In accordance with several aspects of the invention one or more wave plates may be employed to reduce polarization dependent loss (PDL). The one or more wave plates rotates the polarization so that light that is s-polarized on a first pass is p-polarized on a second pass and there is no net polarization dependent loss (PDL) for light traveling through the device. Similarly, a polarization converter such as a rutile crystal may be used in combination with wave plates to reduce PDL.

In accordance with several aspects of the invention, the grating or gratings may operate at or near Littrow to increase the diffraction efficiency. In accordance with several aspects of the invention one or more transmission gratings may be employed. In accordance with several aspects of the invention, a beam displacer made of birefringent crystals or multi-layer coated polarization beamsplitters may be employed to separate and combine optical beams. Different aspects of the invention may also be employed together.

DETAILED DESCRIPTION OF THE INVENTION

The wavelength selective optical switch of the invention has numerous applications, including use in fiber optic telecommunications systems. For purposes of illustration, the embodiments described below detail demultiplexing, switching, and multiplexing in a multi-channel fiber optic telecommunication systems. Exemplary references to an optical channel, or simply to a channel, should be understood to mean an optical signal with a centered wavelength and an upper and lower wavelength. Channel spacing is measured from the center of the first channel to the center of an adjacent channel.

Figure 1A:
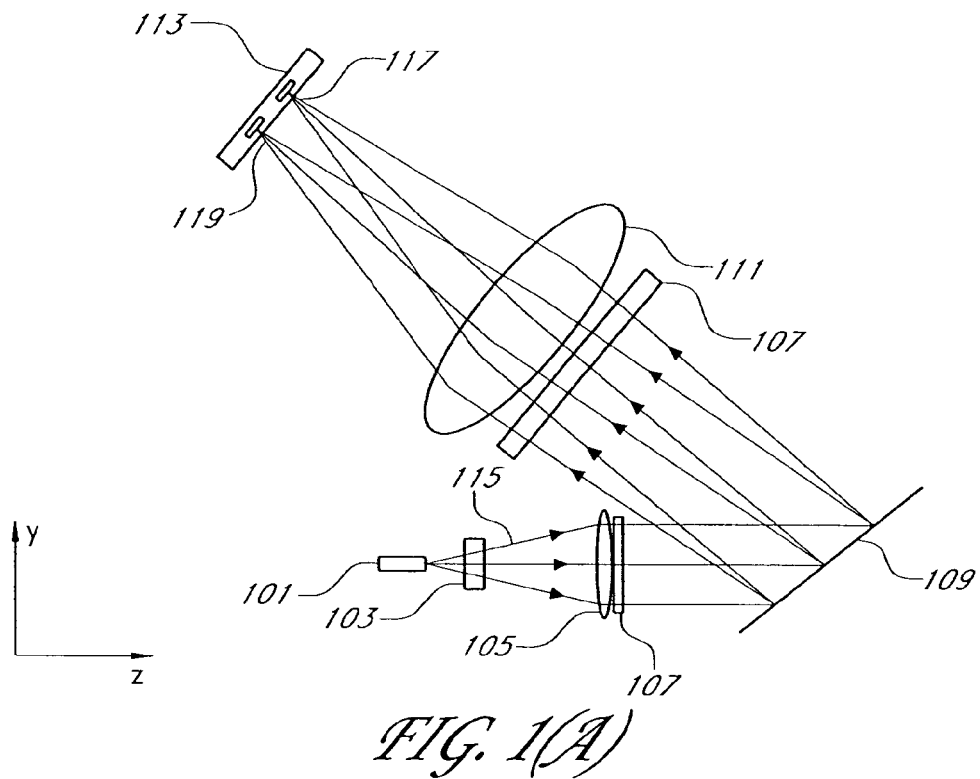
FIG. 1(A) is a perspective view of a first embodiment of a wavelength selective optical switch detailing the optical paths through the device.
Figure 1B:
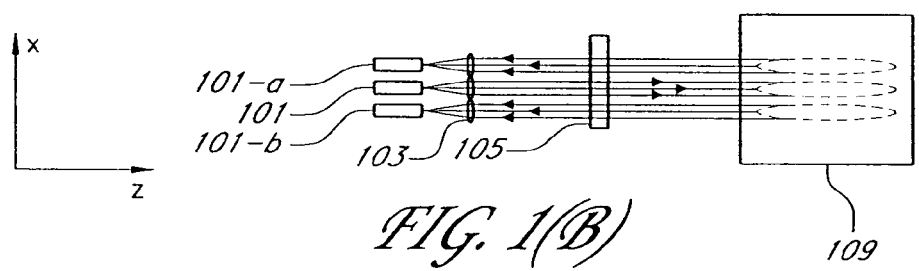
FIG. 1(B) is a perspective view of a first embodiment of a wavelength selective optical switch detailing the optical paths through the device.
Figure 1C:
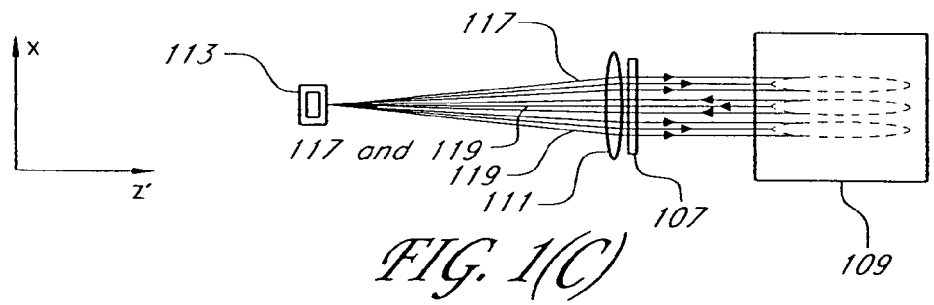
FIG. 1(C) is a perspective view of a first embodiment of a wavelength selective optical switch detailing the optical paths through the device.

A two channel grating-based optical switch, employing one embodiment of the invention, is detailed in FIG. 1(A), FIG. 1(B), and FIG. 1(C). FIG. 1(A), FIG. 1(B), and FIG. 1(C) detail different views of the same device. It is of note that while only two channels are used in this example, a substantially larger number of channels and optical ports may be employed. The wavelength selective optical switch allows for demultiplexing, multiplexing and switching separate optical channels to any one of a plurality of optical ports. The wavelength selective optical switch of FIG. 1 may be dynamically programmed to demultiplex, multiplex and switch any combination of wavelengths to any of a plurality of optical ports.

A first embodiment of the wavelength selective optical switch device of FIG. 1(A), FIG. 1(B), and FIG. 1(C) comprises a Cylindrical Lens Array 103 optically coupled to an Input Fiber 101, an Anamorphic Lens 105, a Grating 109, a Rotationally Symmetric Lens 111, a Array of Programmable Mirrors 113, a first Output Fiber 101-*a*, and a second Output Fiber 101-*b*. A cylindrical lens has at least one surface that is formed like a portion of a cylinder $$z(x)=cx^2/\{1+\text{Sqrt}[1-(1+k)c^2x^2]\}+Ax^4+Bx^6+Cx^8+Dx^{10}$$

where z(x) is the sag, c is the curvature at the pole of the surface, x is the distance from the center of the lens along the x-axis, k is the conic constant, and A, B, C, D are aspheric coefficients. Note that in this case that sag is independent of the y-coordinate. An anamorphic lens, usually having one more cylindrical surfaces, has a different magnification along mutually perpendicular meridians. The device of FIG. 1 may be mounted within an enclosure optimized for optical transmission, including a gas-filled enclosure, or the like.

Cylindrical Lens Array 103, Anamorphic Lens 105, and Rotationally Symmetric Lens 111 may be comprised of multiple lens elements. It is well known in the art that lenses may be comprised of multiple lens elements to achieve a particular optical performance.

The Array of Programmable Mirrors 113 is responsible for steering optical signals. However, other beam steering devices, such as a liquid crystal or the like, may also be employed. Cassarly et-al teach one such liquid crystal beam steering device in U.S. Pat. No. 5,107,357, which is fully incorporated by reference herein. It will be clear to one skilled in the art that beam steering devices may be used in any of the described embodiments. In addition, whichever means is employed for steering the optical signals may also steer the optical signals in more than one axis. This permits, among other things, the steering of optical signals from one port to another port without directing the optical signal to a third port. This allows one port in the system to be steered to another port without interfering with any other ports that might be in use at the time.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on Grating 109. When the prism and Grating 109 are properly designed and configured the effects of temperature on the system are greatly reduced. However, some embodiments of the system do not contain a prism.

Quarter-wave plate (QWP) 107 may also be employed between the Rotationally Symmetric Lens 111 and grating 109 to reduce polarization dependent loss (PDL) in the system. The QWP 107 oriented at 45 deg to the grating lines rotates the polarization so that light that is s-polarized at the grating on the first pass is p-polarized on the second pass and there is no net polarization dependent loss (PDL) for light traveling between the Input Fiber 101 and any of the Output Fibers (101-a through 101-b).

A multi-channel light signal 115 enters the device through the Input Fiber 101, and is directed through one of the Cylindrical Lenses on the Cylindrical Lens Array 103. The Cylindrical Lens on the Cylindrical Lens Array 103 collimates and focuses the multi-channel light signal 115 in the x-axis and directs it through the Anamorphic Lens 105. When beam size is large, the geometrical limit holds and all the rays are parallel in a collimated beam. As the beam size decreases, diffraction becomes important and it is preferable to locate the beam waist at the Grating. The Anamorphic Lens 105 collimates and focuses the multi-channel light signal 115 in the y-axis and directs it through QWP 107, and onto Grating 109. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

The Grating 109 diffracts the individual Channels 117 and 119 of the multi-channel light signal 115 (hereafter channels) towards the Rotationally Symmetric Lens 111. The Rotationally Symmetric Lens 111 is preferably telecentric, so that the central ray, or chief ray, of each channel is parallel at the MEMS plane. This minimizes the tilt required by the MEMS mirrors. In a telecentric lens, the aperture stop is located at the front focus of the lens, resulting in the exit pupil being at infinity. The Rotationally Symmetric Lens 111 focuses the Channels 117 and 119, near the Programmable Mirror on the Mirror Array 113. More specifically, Rotationally Symmetric Lens 111 focuses Channel 117 near the Programmable Mirror associated with Channel 117, and focuses channel 119 near the Programmable Mirror associated with channel 119. By focusing the channels in two axes the optical beam size is reduced and the size of the Programmable Mirrors 117 and 119 and Mirror Array 113 may be reduced.

Depending upon the programmed state of the Programmable Mirrors, each channel may be switched to any one of the two of Output Fibers 101-a or 101-b. In this regard, each the channel is reflected back through the Rotationally Symmetric Lens 111 which collimates the channels toward Grating 109. Grating 109 multiplexes the channels switched to the same output fiber and diffracts the resulting beam toward that output fiber. In the presently detailed case of FIG. 1, the Programmable Mirrors are programmed so as to switch Channel 117 to Output Fiber 101-a and Channel 119 to Output Fiber 101-b. Therefore, Channel 117 is reflected from its Programmable Mirror through Rotationally Symmetric Lens 111 which collimates the Channel towards Grating 109. Grating 109 diffracts Channel 117 through QWP 107 and Anamorphic Lens 105. Anamorphic Lens 105 focuses Channel 117 in the y-axis toward Cylindrical Lens 103, which focuses Channel 117 in the x-axis and into Output Fiber 101-a. Similarly, Channel 119 is reflected from its Programmable Mirror through Rotationally Symmetric Lens 111 which collimates the Channel towards Grating 109. Grating 109 diffracts Channel 119 through QWP 107 and Anamorphic Lens 105. Anamorphic Lens 105 focuses Channel 119 in the y-axis toward Cylindrical Lens 103, which focuses Channel 119 in the x-axis and into Output Fiber 101-b.

The optical configuration is such that the optical signals directed to and entering Output Fibers 101-a and 101b enter the Output Fibers within the cone of acceptance thereby reducing system loss. It will be clear to one skilled in the art that either Channel 117 or Channel 119 may be switched to either Output Fiber 101-a or 101-b by simply changing the angle of reflection of the associated Programmable Mirror. In this regard, the system may be scaled to accommodate both a large number of Output Fibers, but also a large number of channels.

It will be clear to one skilled in the art that the system may be operated in the opposite direction. For example, receiving an optical Channel 117 via Port 101-a, multiplexing it with one or more received optical channels, and directing the multiplexed optical signal via Port 101.

Figure 2A:
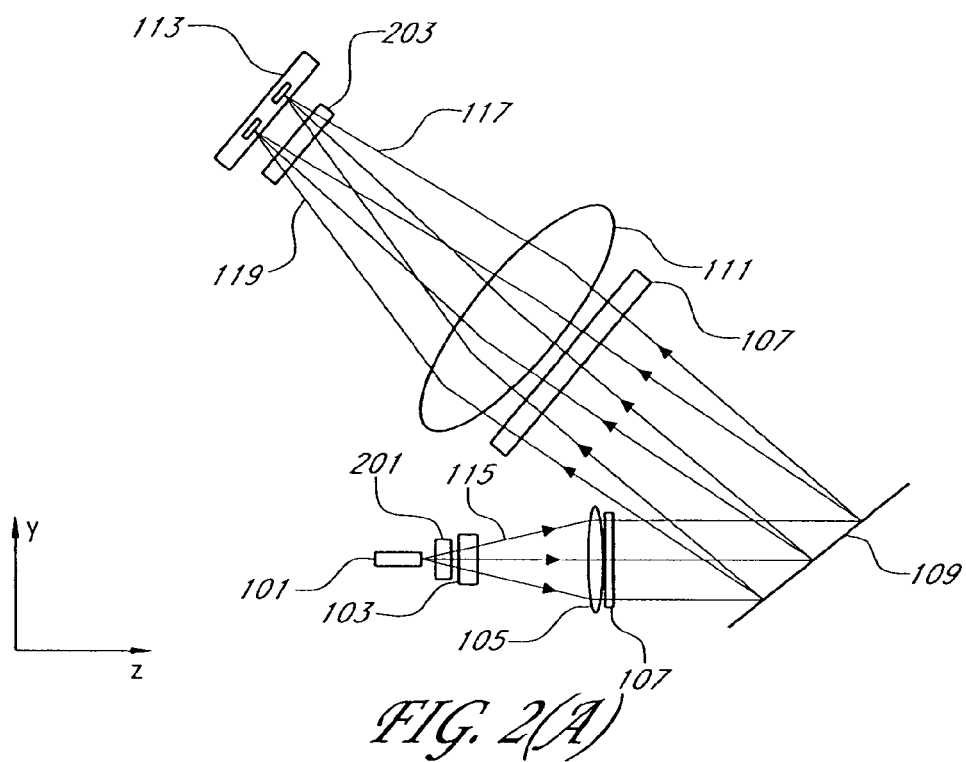
FIG. 2(A) is a perspective view of a first embodiment of a wavelength selective optical switch detailing the optical paths through the device.
Figure 2B:
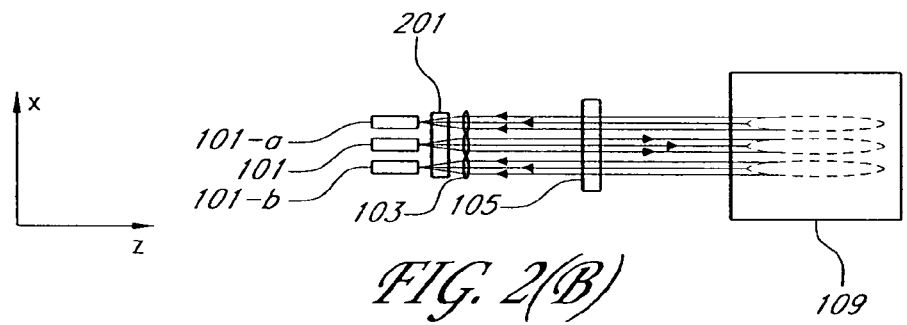
FIG. 2(B) is a perspective view of a first embodiment of a wavelength selective optical switch detailing the optical paths through the device.
Figure 2C:
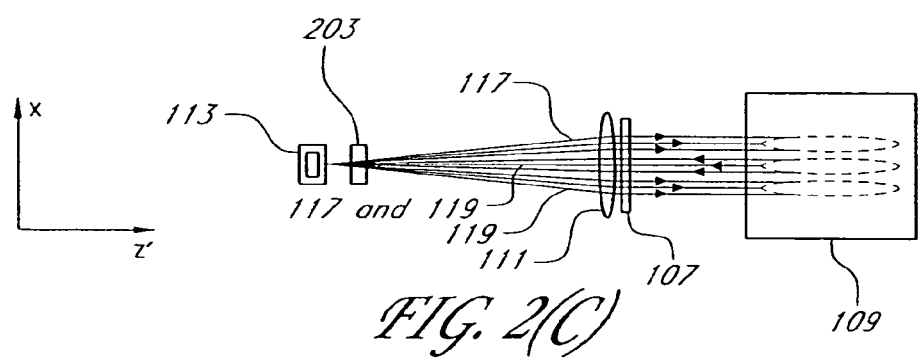
FIG. 2(C) is a perspective view of a first embodiment of a wavelength selective optical switch detailing the optical paths through the device.

Turning next to FIG. 2(A), FIG. 2(B), and FIG. 2(C). FIG. 2(A), FIG. 2(B), and FIG. 2(C) detail different views of the same device. This embodiment operates similarly to the embodiment detailed FIG. 1(A), FIG. 1(B), and FIG. 1(C) above; however, it further employs one or more polarization converters. The operation of a polarization converter is well known in the art. Ducellier teaches one such polarization converter in U.S. Pat. No. 6,411,409, which is fully incorporated by reference herein. As explained, a birefringent crystal beam displacer is oriented in such a way as to separate the input light into two sub-beams with s-polarizations and p-polarizations. A half-wave plate (HWP) covers the p-polarized sub-beam to convert it to s-polarization. Thus, the light leaves the polarization converter with a larger beam, but it is entirely in the s-polarization, which has the highest diffraction efficiency at the high frequency gratings. The birefringent crystal beam displacer preferably uses a uniaxial birefringent crystals such as calcite (CaCO3), yrttrium orthovandate (YVO4) or rutile (TiO2) to separate the beams. Another common polarization converter uses a polarization beam splitter and a waveplate. The waveplate is usually a single half-wave plate oriented at 45 degrees with respect to the groove axis positioned in the path of one of the two sub-beams.

The embodiment of present invention detailed in FIG. 2(A), FIG. 2(B), and FIG. 2(C) employs one or more polarization converters. Polarization Converter 201 is positioned in the optical path between Input Fiber 101 and the Diffraction Grating 109 and converts multi-channel light signal 115 to entirely s-polarized light. Accordingly, when the larger beam width and entirely s-polarized multi-channel light signal 115, illuminates Grating 109, it does so at the highest diffraction efficiency.

Optional Polarization Converter 203, operated in the opposite direction as Polarization Converter 201, is positioned in the optical path between Diffraction Grating 109 and the Array of Programmable Mirrors 113. Polarization Converter 203 re-converts the entirely s-polarized light back to both p-polarized and s-polarized light. Additionally, the size of the combined p-polarized and s-polarized beam leaving the polarization converter is smaller than that of the entirely s-polarized sub-beam entering the converter. This reduces the footprint of the beam at the MEMS mirrors and which enables the use of a smaller size of the MEMS mirror without incurring additional insertion losses. It will be clear to one skilled in the art that there are many ways to ensure that the grating efficiency is maximized by illuminating only with s-polarized light.

Figure 3A:
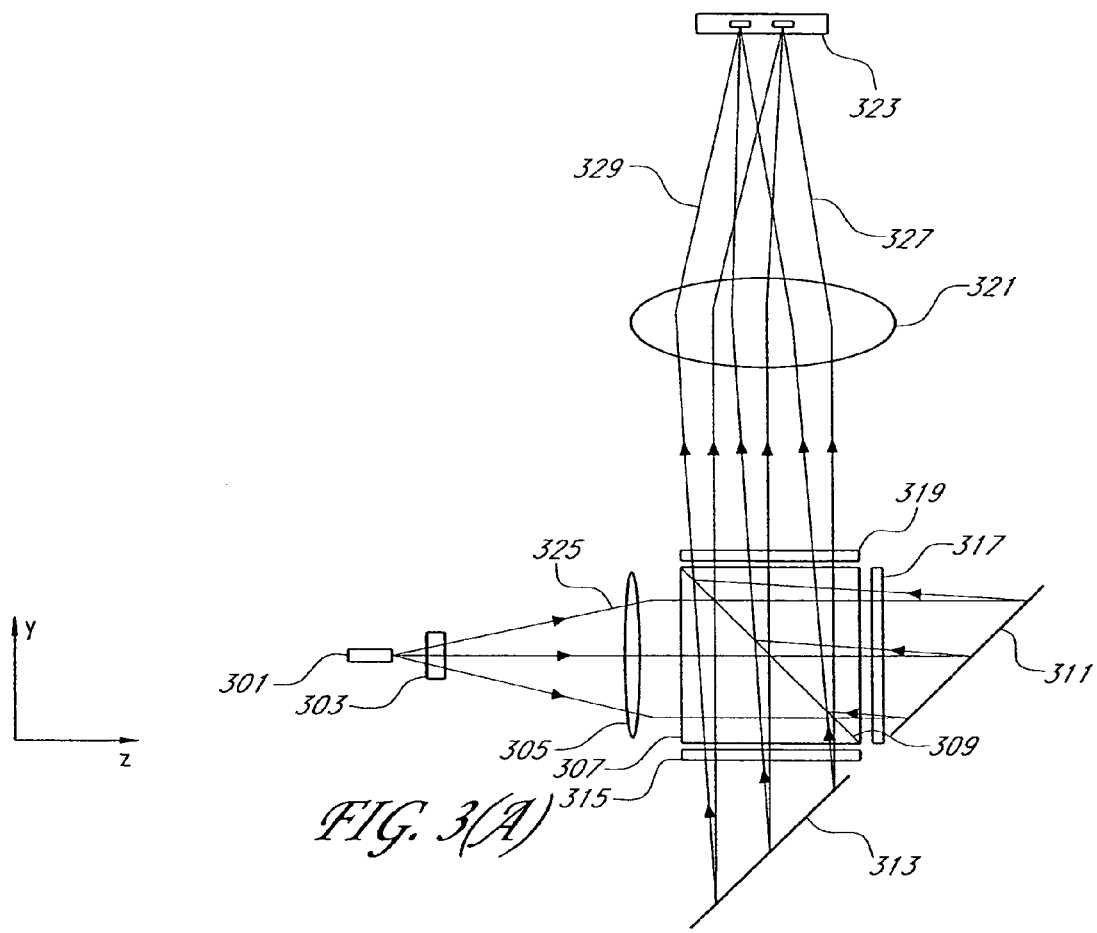
FIG. 3(A) is a perspective view of a second embodiment of a wavelength selective optical switch detailing the optical paths through the device.
Figure 3B:
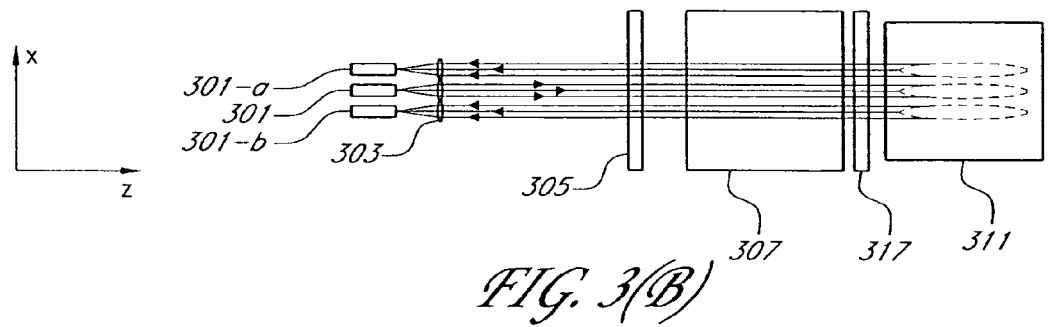
FIG. 3(B) is a perspective view of a second embodiment of a wavelength selective optical switch detailing the optical paths through the device.
Figure 3C:
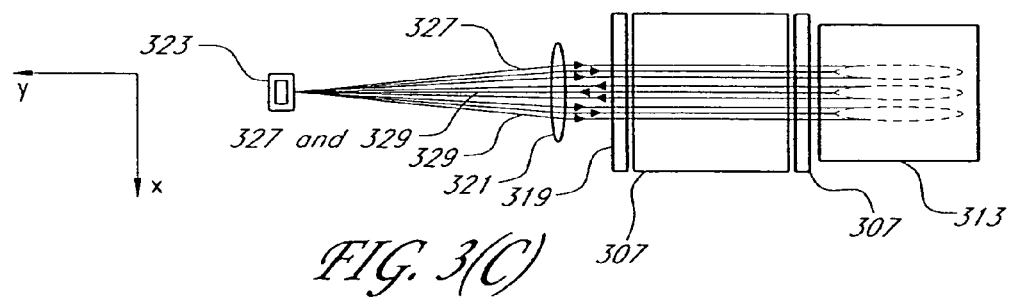
FIG. 3(C) is a perspective view of a second embodiment of a wavelength selective optical switch detailing the optical paths through the device.

A two channel grating-based optical switch, employing one embodiment of the invention, is detailed in FIG. 3(A), FIG. 3(B), and FIG. 3(C). FIG. 3(A), FIG. 3(B), and FIG. 3(C) detail different views of the same device. It is of note that while only two channels are used in this example, a substantially larger number of channels and optical ports may be employed. This embodiment allows for demultiplexing, multiplexing and switching separate optical channels to any one of a plurality of optical ports. This embodiment may be dynamically programmed to demultiplex, multiplex and switch any combination of wavelengths to any of a plurality of optical ports.

A Littrow grating is a grating that operates at or near Littrow. Littrow is a special, but common case, in which the angle of incidence of the light on the grating is equal to the angle of diffraction] for which the grating equation becomes:

$$ml = 2d \sin(a)$$

where a is the incident angle (same as the diffracted angle), m is the grating order, l is the wavelength, and d is the grating groove spacing. For a reflection grating, rays diffract off the grating back toward the direction from which they originated. In one embodiment, the grating is used near the Littrow condition. Further, using the gratings near the Littrow condition takes advantage of the high diffraction efficiency near the Littrow condition.

The embodiment of the wavelength selective optical switch, detailed in FIG. 3(A), FIG. 3(B), and FIG. 3(C), comprises a Cylindrical Lens Array 303 optically coupled to an Input Fiber 301, an Anamorphic Lens 305, a Polarization Beam Splitter (PBS) 307, Littrow Gratings 311 and 313, QWP 315, QWP 317, QWP 319, a Rotationally Symmetric Lens 321, a Array of Programmable Mirrors 323, a first Output Fiber 301-a, and a second Output Fiber 301-b. The device of FIG. 3 may be mounted within an enclosure optimized for optical transmission, including a gas-filled enclosure, or the like. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

Anamorphic Lens 305 and Rotationally Symmetric Lens 311 may be comprised of multiple lens elements. It is well known in the art that lenses may be comprised of multiple lens elements to achieve a particular optical performance.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on Gratings 311 and 313. When the prism and Gratings 311 and 313 are properly designed and configured the effects of temperature on the system are greatly reduced. However, some embodiments of the system do not contain a prism.

QWP 319 may also be employed to reduce polarization dependent loss (PDL) in the system. QWP 319 oriented at 45 degrees to the grating lines rotates the polarization of light, so that light that is s-polarized at the grating on the first pass is p-polarized on the second pass. The net result is no polarization dependent loss (PDL) for light traveling between the Input Fiber 301 and any of the Output Fibers 301-a and 301-b.

A multi-channel light signal 315 enters the device through the Input Fiber 301, and is directed through one of the Cylindrical Lenses on the Cylindrical Lens Array 303. The Cylindrical Lens on the Cylindrical Lens Array 303 collimates the multi-channel light signal 315 in the x-axis and directs it through the Anamorphic Lens 305. When beam size is large, the geometrical limit holds and all the rays are parallel in a collimated beam. As the beam size decreases, diffraction becomes important and it is preferable to locate the beam waist at the Grating. The Anamorphic Lens 305 collimates and focuses the multi-channel light signal 315 in the y-axis and directs into the PBS 307. The PBS separates multi-channel light signal 315 into its s-polarized and p-polarized states.

Figure 4:
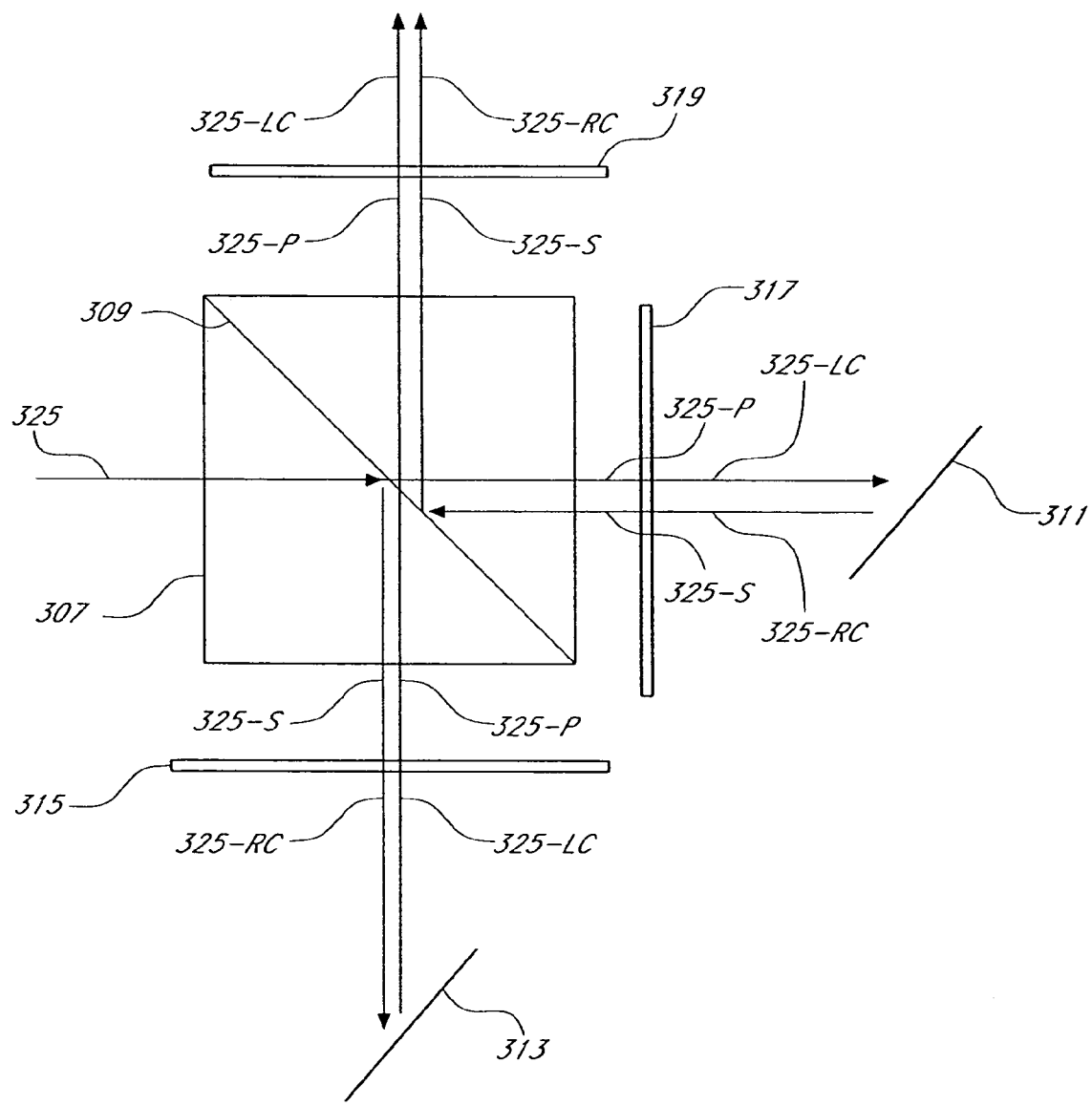
FIG. 4 is a perspective view of a second embodiment of a wavelength selective optical switch detailing the optical polarization states at various locations within the device.

Turning briefly to FIG. 4., the polarization states of multi-channel light signal 315 are described in detail. Multi-channel light signal 325 enters the PBS 307 and strikes upon the Beam Splitting Surface 309. The s-polarized optical component reflects off of Beam Splitting Surface 309 and exits the PBS 307. This s-polarized optical component 325-S passes through QWP 315, which converts the polarization state to right-circular 325-RC, and illuminates Littrow Grating 313. Littrow Grating 313 diffracts the individual channels of light (now left-circular polarized after diffracting of Littrow Grating 313) back through QWP 315 which converts their polarization to a p-polarized state 325-P, and into the PBS 309. Because these individual channels are now p-polarized they transmit through Beam Splitting Surface 309 and exit the PBS 307, passing though QWP 319 that converts the polarization states from p-polarized to left-circular 325-LC.

In much the same fashion as described above with the s-polarized optical component, the p-polarized optical component transmits through Beam Splitting Surface 309, exits PBS 307, and passes though QWP 317 which converts the polarization state from p-polarized to left-circular, and illuminates Littrow Grating 311. Littrow Grating 311 diffracts the individual channels of light (now right-circular polarized) back through QWP 317 that converts their polarization to an s-polarized state, and into the PBS 309. The s-polarized optical component reflects off of Beam Splitting Surface 309 and exits the PBS 307 passing though QWP 319 that converts the polarization states from s-polarized to right-circular 325-RC.

Turning again to FIG. 3(A), FIG. 3(B), and FIG. 3(C), Grating 313 and 311 diffracts the individual Channels 327 and 329 of the multi-channel light signal 325 (hereafter channels) through the PBS 307 and towards the Rotationally Symmetric Lens 321. The Rotationally Symmetric Lens 321 is preferably telecentric, so that the central ray, or chief ray, of each channel is parallel at the MEMS plane. This minimizes the tilt required by the MEMS mirrors. In a telecentric lens, the aperture stop is located at the front focus of the lens, resulting in the exit pupil being at infinity. The Rotationally Symmetric Lens 321 focuses Channels 317 and 319 in both the x-axis and z-axis, near the Programmable Mirror on the Mirror Array 313. More specifically, Rotationally Symmetric Lens 321 focuses Channel 327 near the Programmable Mirror associated with Channel 327, and focuses channel 329 near the Programmable Mirror associated with channel 329. By focusing the channels in both the x-axis and z-axis, the optical beam size is reduced.

Depending upon the programmed state of the Programmable Mirrors, each channel may be switched to any one of the two of Output Fibers 301-a or 301-b. In this regard, each the channel is reflected back through the Rotationally Symmetric Lens 321 which collimates the channels in both the x-axis and z-axis and directs the channels through PBS 307 and onto Gratings 311 and 313. Gratings 311 and 313 multiplex the channels switched to the same output fiber and diffracts the resulting beam toward that output fiber. In the presently detailed case of FIG. 3, the Programmable Mirrors are programmed so as to switch Channel 327 to Output Fiber 301-a and Channel 329 to Output Fiber 301-b.

The optical configuration is such that the optical signals directed to and entering Output Fibers 301-a and 301b enter the Output Fibers within the cone of acceptance thereby reducing system loss. It will be clear to one skilled in the art that either Channel 317 or Channel 319 may be switched to either Output Fiber 301-a or 301-b by simply changing the angle of reflection of the associated Programmable Mirror. In this regard, the system may be scaled to accommodate both a large number of Output Fibers, but also a large number of channels.

It will be clear to one skilled in the art that the system may be operated in the opposite direction. For example, by receiving an optical Channel 327 via Port 301-a, multiplexing it with one or more received optical channels, and directing the multiplexed optical signal via Port 301.

Figure 5A:
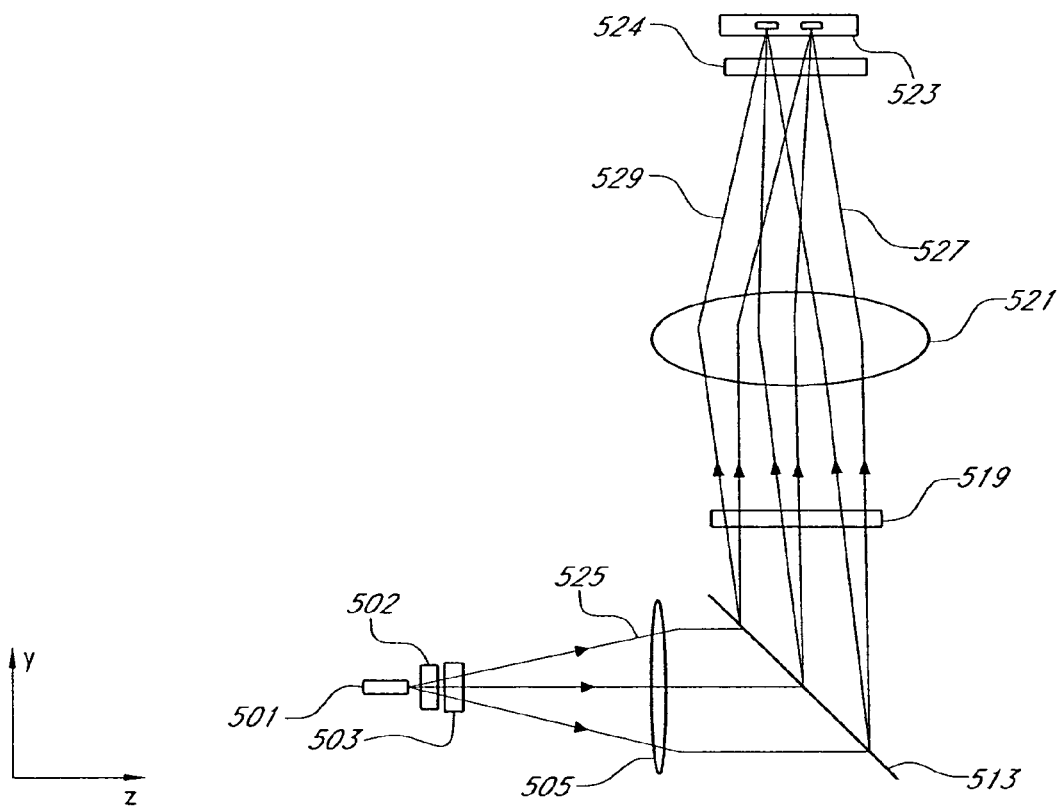
FIG. 5(A) is a perspective view of a third embodiment of a wavelength selective optical switch detailing the optical paths through the device.
Figure 5B:
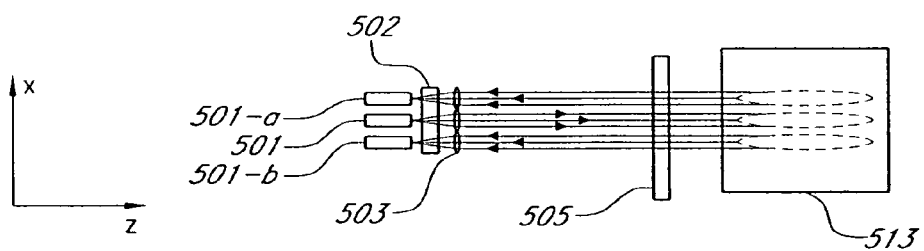
FIG. 5(B) is a perspective view of a third embodiment of a wavelength selective optical switch detailing the optical paths through the device.
Figure 5C:
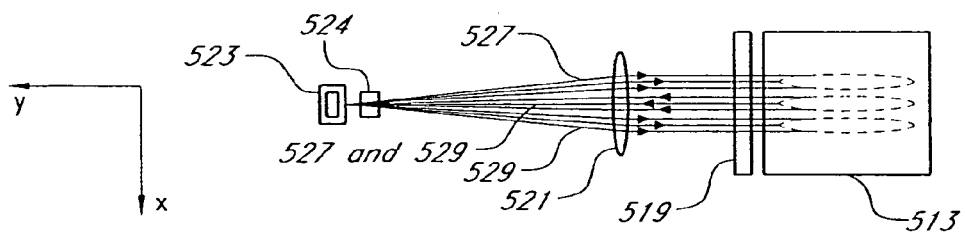
FIG. 5(C) is a perspective view of a third embodiment of a wavelength selective optical switch detailing the optical paths through the device.

A two channel grating-based optical switch, employing one embodiment of the invention, is detailed in FIG. 5(A), FIG. 5(B), and FIG. 5(C). FIG. 5(A), FIG. 5(B), and FIG. 5(C) detail different views of the same device. It is of note that while only two channels are used in this example, a substantially larger number of channels and optical ports may be employed. The wavelength selective optical switch allows for demultiplexing, switching separate optical channels, and multiplexing to any one of a plurality of optical ports. The wavelength selective optical switch of FIG. 5 may be dynamically programmed to demultiplex, multiplex and switch any combination of wavelengths to any of a plurality of optical ports.

The embodiment of the wavelength selective optical switch device of FIG. 5(A), FIG. 5(B), and FIG. 5(C) comprises a Cylindrical Lens Array 503 optically coupled to an Input Fiber 501, an Anamorphic Lens 505, a transmissive Grating 513 operating near Littrow, a Rotationally Symmetric Lens 521, a Array of Programmable Mirrors 523, a first Output Fiber 501-a, and a second Output Fiber 501-b. The device of FIG. 5 may be mounted within an enclosure optimized for optical transmission, including a gas-filled enclosure, or the like. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

Anamorphic Lens 505 and Rotationally Symmetric Lens 521 may be comprised of multiple lens elements. It is well known in the art that lenses may be comprised of multiple lens elements to achieve a particular optical prescription.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on Grating 513. When the prism and Grating 513 are properly designed and configured the effects of temperature on the system are greatly reduced. However, some embodiments of the system do not contain a prism.

The embodiment of present invention detailed in FIG. 5(A), FIG. 5(B), and FIG. 5(C) employs one or more polarization converters. Polarization Converter 502 is positioned in the optical path between Input Fiber 501 and the Grating 513 and converts multi-channel light signal 525 to entirely s-polarized light. Accordingly, when the larger beam width and entirely s-polarized multi-channel light signal 525, illuminates Grating 513, it does so at the highest diffraction efficiency.

Optional Polarization Converter 524, operated in the opposite direction as Polarization Converter 502, is positioned in the optical path between Grating 513 and the Array of Programmable Mirrors 523. Polarization Converter 524 re-converts the entirely s-polarized light back to both p-polarized and s-polarized light. Additionally, the size of the combined p-polarized and s-polarized beam leaving the polarization converter is smaller than that of the entirely s-polarized sub-beam entering the converter. This reduces the footprint of the beam at the MEMS mirrors and which enables the use of a smaller size of the MEMS mirror without incurring additional insertion losses.

A multi-channel light signal 525 enters the device through the Input Fiber 501, and is directed through one of the Cylindrical Lenses on the Cylindrical Lens Array 503. The Cylindrical Lens on the Cylindrical Lens Array 503 collimates the multi-channel light signal 525 in the x-axis and directs it through the Anamorphic Lens 505. When beam size is large, the geometrical limit holds and all the rays are parallel in a collimated beam. As the beam size decreases, diffraction becomes important and it is preferable to locate the beam waist at the Grating. The Anamorphic Lens 505 collimates and focuses the multi-channel light signal 525 in the y-axis and directs it through Grating 513. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

The Grating 513 diffracts the individual Channels 527 and 529 of the multi-channel light signal 525 (hereafter channels) through QWP 519 and towards the Rotationally Symmetric Lens 521. The Rotationally Symmetric Lens 521 focuses the Channels 527 and 529, in both the x-axis and z-axis, near the Programmable Mirror on the Mirror Array 523. More specifically, Rotationally Symmetric Lens 521 focuses Channel 527 near the Programmable Mirror associated with Channel 527, and focuses channel 529 near the Programmable Mirror associated with channel 529. By focusing the channels in both the x-axis and z-axis, the optical beam size is reduced and the size of the Programmable Mirrors and Mirror Array 523 may be reduced. Further, the focal length may be reduced thereby compacting the device.

Depending upon the programmed state of the Programmable Mirrors, each channel may be switched to any one of the two of Output Fibers 501-*a* or 501-*b*. In this regard, each the channel is reflected back through the Rotationally Symmetric Lens 521 which collimates the channels in both the x-axis and z-axis and directs the channels through Grating 513. Grating 513 multiplexes the channels switched to the same output fiber and diffracts the resulting beam toward that output fiber. In the presently detailed case of FIG. 5, the Programmable Mirrors are programmed so as to switch Channel 527 to Output Fiber 501-*a* and Channel 529 to Output Fiber 501-*b*.

The optical configuration is such that the optical signals directed to and entering Output Fibers 501-*a* and 501*b* enter the Output Fibers within the cone of acceptance thereby reducing system loss. It will be clear to one skilled in the art that either Channel 527 or Channel 529 may be switched to either Output Fiber 501-*a* or 501-*b* by simply changing the angle of reflection of the associated Programmable Mirror. In this regard, the system may be scaled to accommodate both a large number of Output Fibers, but also a large number of channels.

It will be clear to one skilled in the art that the system may be operated in the opposite direction. For example, by receiving an optical Channel 527 via Port 501-*a*, multiplexing it with one or more received optical channels, and directing the multiplexed optical signal via Port 501.

Figure 6A:
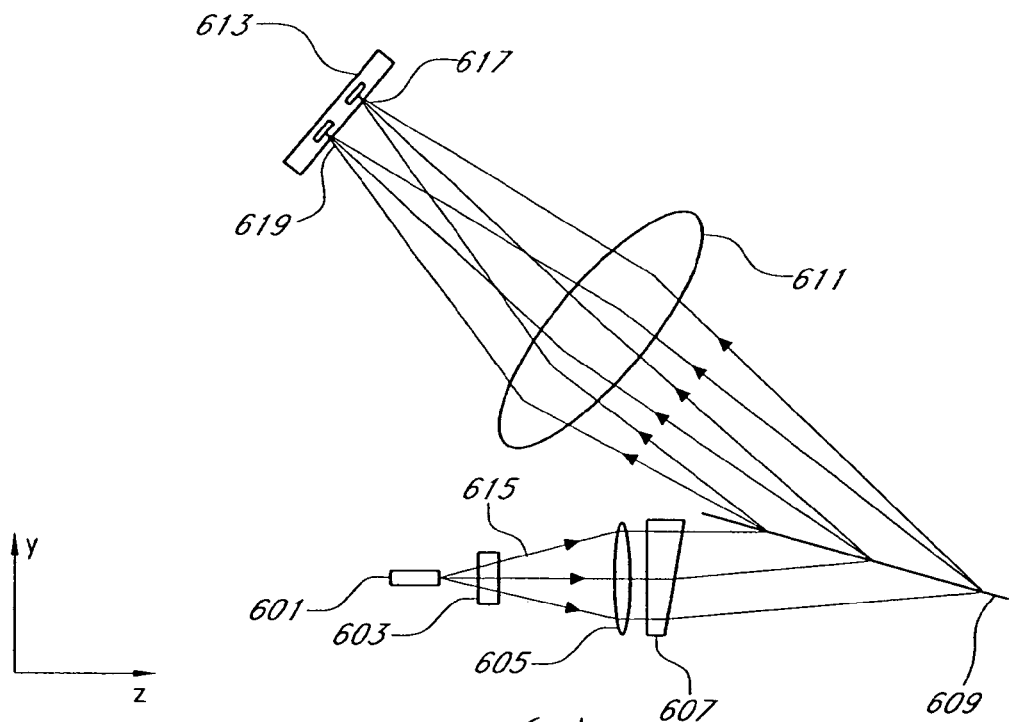
FIG. 6(A) is a perspective view of a fourth embodiment of a wavelength selective optical switch detailing the optical paths through the device.
Figure 6B:
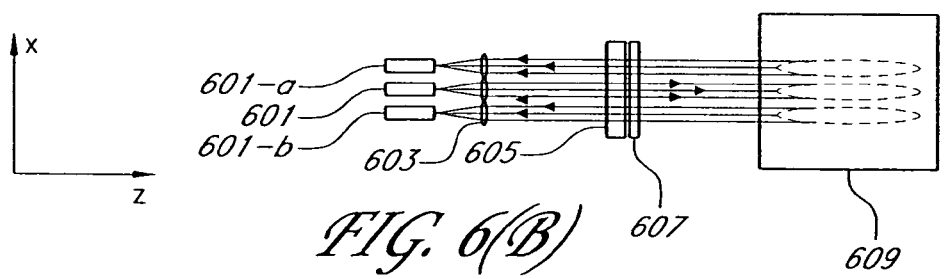
FIG. 6(B) is a perspective view of a fourth embodiment of a wavelength selective optical switch detailing the optical paths through the device.
Figure 6C:
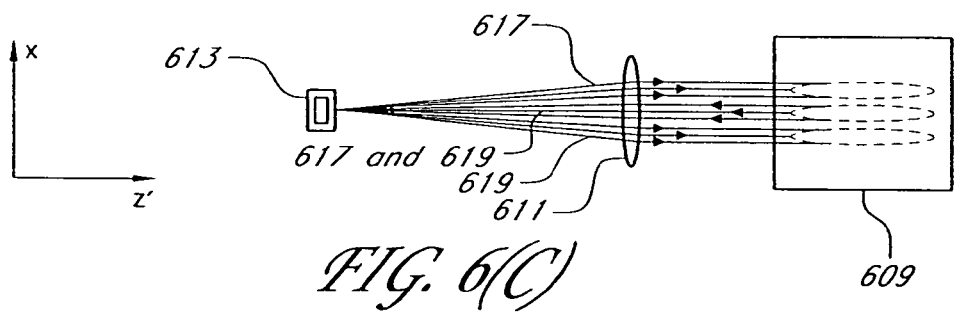
FIG. 6(C) is a perspective view of a fourth embodiment of a wavelength selective optical switch detailing the optical paths through the device.

A seventeen port grating-based optical switch for sixty four 100 GHz spaced channels, employing one embodiment of the invention, is detailed in FIG. 6(A), FIG. 6(B), and FIG. 6(C). FIG. 6(A), FIG. 6(B), and FIG. 6(C) detail different views of the same device. For clarity, in FIG. 6(A), FIG. 6(B), and FIG. 6(C), only the center and extreme ports, and 2 optical channels, are depicted. The wavelength selective optical switch allows for demultiplexing, switching separate optical channels, and multiplexing to any one of a plurality of optical ports. The wavelength selective optical switch of FIG. 6 may be dynamically programmed to demultiplex, switch, and multiplex any combination of channels to any of a plurality of optical ports.

The embodiment of the wavelength selective optical switch device of FIG. 6(A), FIG. 6(B), and FIG. 6(C) comprises a Cylindrical Lens Array 603 optically coupled to an Input Fiber 601, a Cylindrical Lens 605, a prism 607, a transmission Grating 609 operating near Littrow, a Rotationally Symmetric Lens 611, an Array of Programmable Mirrors 613, a first Output Fiber 601-*a*, and a second Output Fiber 601-*b*. The device of FIG. 6 may be mounted within an enclosure optimized for optical transmission, including a gas-filled enclosure, or the like. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

Cylindrical Lens 605 and Rotationally Symmetric Lens 611 are both comprised of multiple lens elements. It is well known in the art that lenses may be comprised of multiple lens elements to reduce the lens aberrations over a large range of frequencies (6.4 THz), operating temperatures (−20° C. to 70° C.), and field of view. Cylindrical Lens 605 and Rotationally Symmetric Lens 611 have numeric apertures of 0.2 and 0.235, respectively. Table 1 lists the optical prescription for the wavelength selective optical switch in CODE V format.

TABLE 1

Optical Prescription for seventeen port grating-based optical switch

| OBJ: | | RDY | THI | RMD | GLA |
|---|---|---|---|---|---|
| | | INFINITY | 3.146570 | | |
| 1: | | INFINITY | 0.450000 | | SILICON_SPECIAL |
| 2: | | INFINITY | 0.000000 | | |
| | RDX: | −8.10984 | | | |
| | Lens spacing: | 1.3347E+00 | | | |
| | A: | 1.2682E−03 | | | |
| 3: | | INFINITY | 0.453430 | | AIR |
| 4: | | −3.30747 | 2.919365 | | SF11_SCHOTT |
| | CYL: | | | | |
| | RDX: | INFINITY | | | |
| 5: | | −3.74895 | 11.188256 | | AIR |
| | CYL: | | | | |
| | RDX: | INFINITY | | | |
| 6: | | −39.82847 | 2.000000 | | SF15_SCHOTT |

TABLE 1-continued

Optical Prescription for seventeen port grating-based optical switch

| OBJ: | RDY | | THI | RMD | GLA | | |
|---|---|---|---|---|---|---|---|
| CYL: | | | | | | | |
| RDX: | INFINITY | | | | | | |
| 7: | 8.25289 | | 3.069427 | | NBAK1_SCHOTT | | |
| CYL: | | | | | | | |
| RDX: | INFINITY | | | | | | |
| 8: | −7.03286 | | 0.214935 | | AIR | | |
| CYL: | | | | | | | |
| RDX: | INFINITY | | | | | | |
| 9: | −6.44129 | | 2.000000 | | NBK10_SCHOTT | | |
| CYL: | | | | | | | |
| RDX: | INFINITY | | | | | | |
| 10: | 9.62630 | | 2.938672 | | NSK2_SCHOTT | | |
| CYL: | | | | | | | |
| RDX: | INFINITY | | | | | | |
| 11: | −15.90151 | | 0.328897 | | AIR | | |
| CYL: | | | | | | | |
| RDX: | INFINITY | | | | | | |
| 12: | INFINITY | | 3.000000 | | SF14_SCHOTT | | |
| SLB: | "prism" | | | | | | |
| 13: | INFINITY | | 3.000000 | | AIR | | |
| XDE: | 0.000000 | YDE: | 0.000000 | ZDE: | 0.000000 | | |
| ADE: | 15.219671 | BDE: | 0.000000 | CDE: | 0.000000 | | |
| 14: | INFINITY | | 0.000000 | | AIR | | |
| XDE: | 0.000000 | YDE: | 0.000000 | ZDE: | 0.000000 | | |
| ADE: | 0.1e21 | BDE: | 0.000000 | CDE: | 0.000000 | | |
| 15: | INFINITY | | 0.000000 | | AIR | | |
| XDE: | 0.000000 | YDE: | −2.190327 | ZDE: | 17.000000 | GLB | G12 |
| ADE: | −76.238409 | BDE: | 0.000000 | CDE: | 0.000000 | | |
| 16: | INFINITY | | 2.000000 | | SILICA_SPECIAL | | |
| STO: | INFINITY | | 2.000000 | | SILICA_SPECIAL | | |
| SLB: | "grt" | | | | | | |
| GL2: | AIR | | | | | | |
| GRT: | | | | | | | |
| GRO: | −1.000000 | GRS: | 0.000909 | | | | |
| GRX: | 0.000000 | GRY: | 1.000000 | GRZ: | 0.000000 | | |
| 18: | INFINITY | | 2.000000 | | AIR | | |
| 19: | INFINITY | | 10.626347 | | AIR | | |
| XDE: | 0.000000 | YDE: | −3.824794 | ZDE: | 0.000000 | | |
| ADE: | −56.872509 | BDE: | 0.000000 | CDE: | 0.000000 | | |
| 20: | 40.02527 | | 5.798156 | | NLASF31_SCHOTT | | |
| SLB: | "foc" | | | | | | |
| 21: | −510.83375 | | 5.947632 | | NLAK10_SCHOTT | | |
| 22: | 127.58156 | | 1.702233 | | AIR | | |
| 23: | 19.84076 | | 4.276553 | | NSF1_SCHOTT | | |
| 24: | 25.60107 | | 4.125666 | | SF1_SCHOTT | | |
| 25: | 12.99810 | | 11.900816 | | AIR | | |
| 26: | −21.31335 | | 2.894729 | | NLAK10_SCHOTT | | |
| 27: | 68.54462 | | 12.995558 | | NLASF31_SCHOTT | | |
| 28: | −31.91252 | | 6.790847 | | AIR | | |
| 29: | 43.81835 | | 12.994567 | | SF57_SCHOTT | | |
| 30: | −47.90572 | | 12.994310 | | SFL57_SCHOTT | | |
| 31: | 138.80596 | | 5.065914 | | AIR | | |
| 32: | INFINITY | | 0.000000 | | | | |
| XDE: | 0.000000 | YDE: | 0.000000 | ZDE: | 0.000000 | DAR | |
| ADE: | 0.371634 | BDE: | 0.000000 | CDE: | 0.000000 | | |
| IMG: | INFINITY | | 0.000000 | | | | |

The embodiment of present invention detailed in FIG. 6(A), FIG. 6(B), and FIG. 6(C) employs a Volume Holographic Grating 609 with 1100 grooves/mm made on a substrate with low coefficient of thermal expansion, such as fused silica. Because this grating has poor efficiency in the p-polarization, the s- and p-polarization are split (not shown) and the s-polarization is switched by the optics shown in FIG. 6(A), FIG. 6(B), and FIG. 6(C). The p-polarization is rotated by 90°, so that it is s-polarized, and sent through a set of optics that are identical to the s-polarized optics. This technique of splitting the two polarizations and running each through an identical set of optics is known as polarization diversity.

Prism 607 is employed to compensate for changes in the grating groove spacing with temperature. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, prism 607 is used to balance the thermal affects on Grating 609. When Prism 607 and Grating 609 are properly designed and configured the effects of temperature on the system are greatly reduced. Prism 607 is preferable made of a glass with a large change in the optical path length with temperature, such as SF14 by Schott, to minimize the prismatic power required.

A multi-channel light signal 615 enters the device through the Input Fiber 601, and is directed through one of the Cylindrical Lenses on the Cylindrical Lens Array 603. The Cylindrical Lens on the Cylindrical Lens Array 603 collimates the multi-channel light signal 615 in the x-axis and directs it through the Anamorphic Lens 605. When beam size is large, the geometrical limit holds and all the rays are parallel in a collimated beam. As the beam size decreases, diffraction becomes important and it is preferable to locate the beam waist at the Grating. The Cylindrical Lens 605 collimates and focuses the multi-channel light signal 615 in the y-axis and directs it through Grating 609.

The Grating 609 diffracts the individual Channels 617 and 619 (hereafter channels) of the multi-channel light signal 615 towards the Rotationally Symmetric Lens 611. The Rotationally Symmetric Lens 611 focuses the Channels 617 and 619, near the Programmable Mirror on the Mirror Array 613. More specifically, Rotationally Symmetric Lens 611 focuses Channel 617 near the Programmable Mirror associated with Channel 617, and focuses channel 619 near the Programmable Mirror associated with channel 619. By focusing the channels, the optical beam size is reduced and the size of the Programmable Mirrors and Mirror Array 613 may be reduced. Further, the focal length may be reduced thereby compacting the device.

Depending upon the programmed state of the Programmable Mirrors, each channel may be switched to any one of the Output Fibers 601-*a* or 601-*b*. In this regard, each the channel is reflected back through the Rotationally Symmetric Lens 611 which collimates the channels and directs the channels through Grating 609. Grating 609 multiplexes the channels switched to the same output fiber and diffracts the resulting beam toward that output fiber. In the presently detailed case of FIG. 6, the Programmable Mirrors are programmed so as to switch Channel 617 to Output Fiber 601-*a* and Channel 619 to Output Fiber 601-*b*.

The optical configuration is such that the optical signals directed to and entering Output Fibers 601-*a* and 601*b* enter the Output Fibers within the cone of acceptance thereby reducing system loss. It will be clear to one skilled in the art that either Channel 617 or Channel 619 may be switched to either Output Fiber 601-*a* or 601-*b* by simply changing the angle of reflection of the associated Programmable Mirror. In this regard, the system supports both a large number of Output Fibers, and a large number of channels.

It will be clear to one skilled in the art that the system may be operated in the opposite direction. For example, by receiving an optical Channel 617 via Port 601-*a*, multiplexing it with one or more received optical channels, and directing the multiplexed optical signal via Port 601.

Figure 7A:
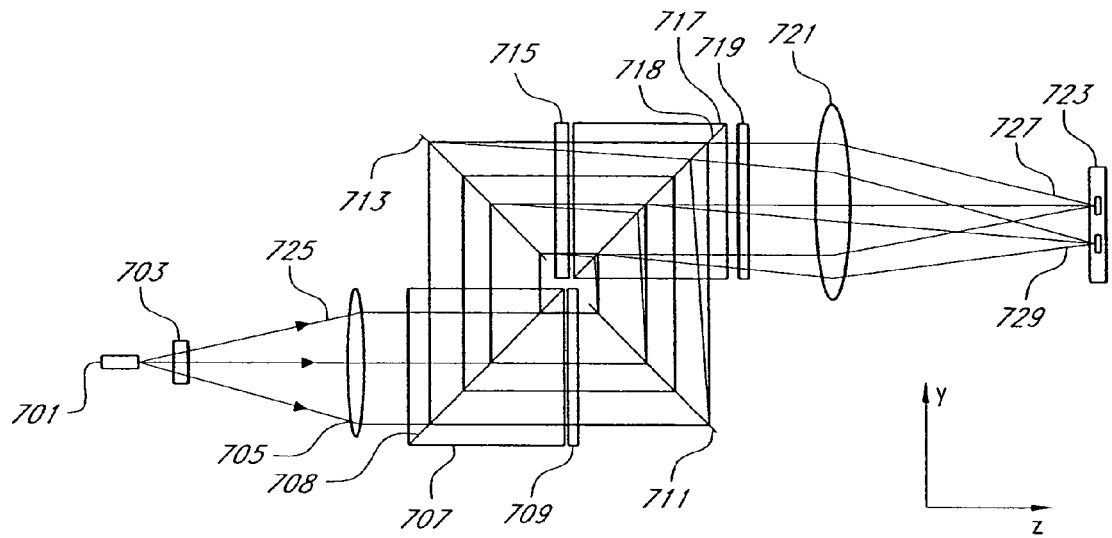
FIG. 7(A) is a perspective view of a fifth embodiment of a wavelength selective optical switch detailing the optical paths through the device.
Figure 7B:
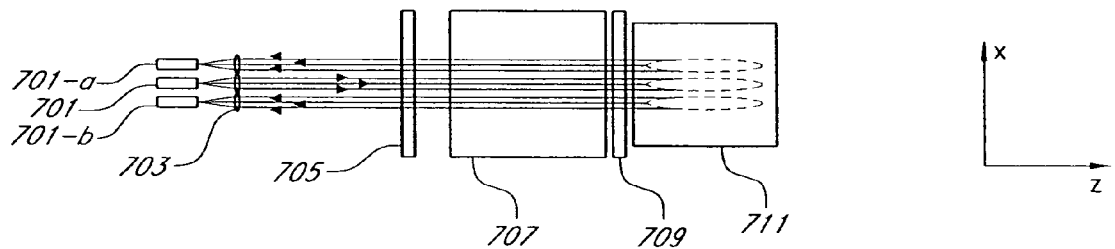
FIG. 7(B) is a perspective view of a fifth embodiment of a wavelength selective optical switch detailing the optical paths through the device.
Figure 7C:
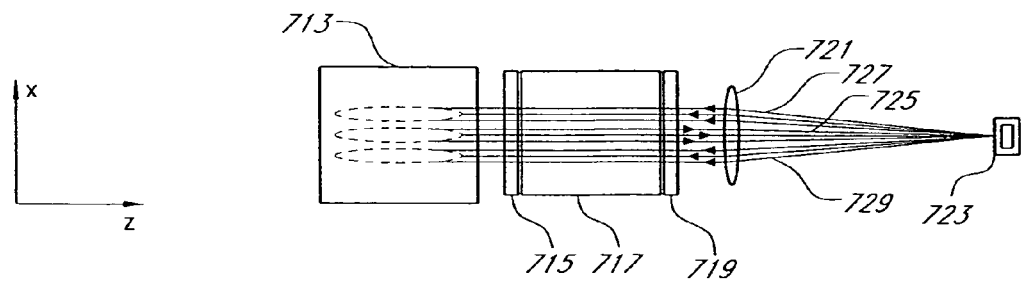
FIG. 7(C) is a perspective view of a fifth embodiment of a wavelength selective optical switch detailing the optical paths through the device.
Figures 8A, 8D:
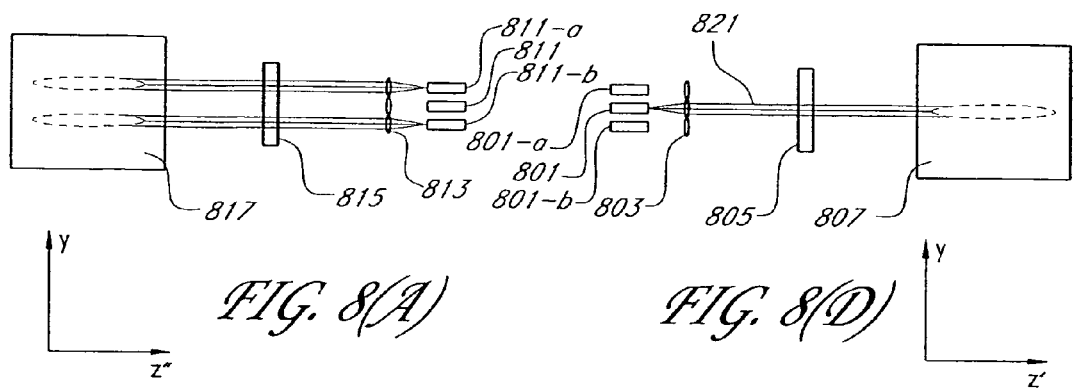
FIG. 8(A) is a perspective view of a sixth embodiment of a wavelength selective optical switch detailing the optical paths through the device.
FIG. 8(D) is a perspective view of a sixth embodiment of a wavelength selective optical switch detailing the optical paths through the device.
Figure 8B:
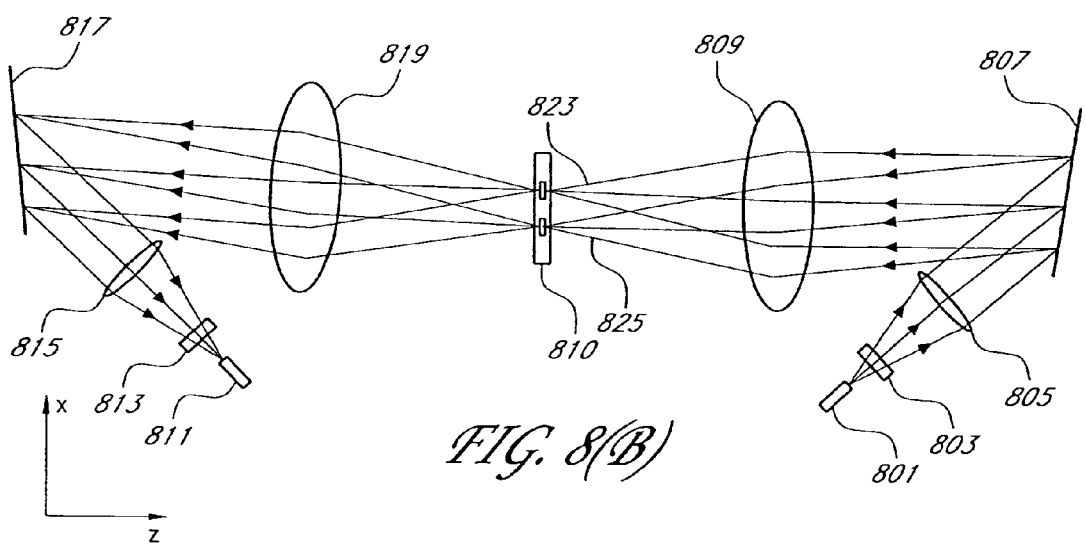
FIG. 8(B) is a perspective view of a sixth embodiment of a wavelength selective optical switch detailing the optical paths through the device.
Figure 8C:
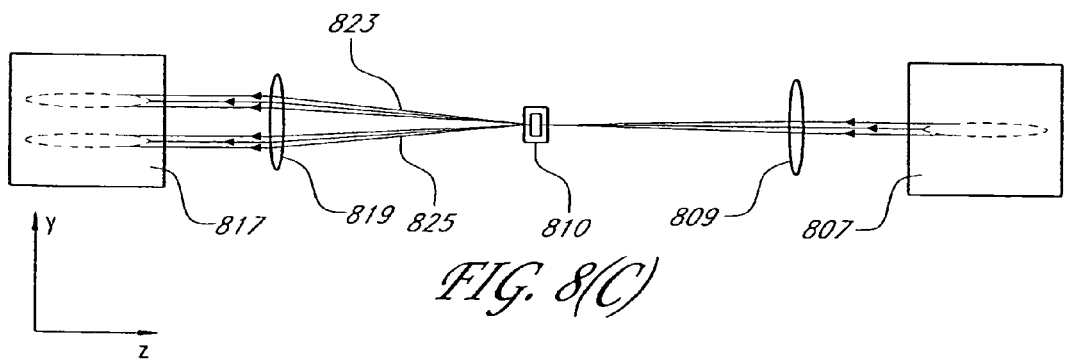
FIG. 8(C) is a perspective view of a sixth embodiment of a wavelength selective optical switch detailing the optical paths through the device.

A two channel grating-based optical switch, employing one embodiment of the invention, is detailed in FIG. 7(A), FIG. 7(B), and FIG. 7(C). FIG. 7(A), FIG. 7(B), and FIG. 7(C) detail different views of the same device. It is of note that while only two channels are used in this example, a substantially larger number of channels and optical ports may be employed. This embodiment allows for demultiplexing, multiplexing and switching separate optical channels to any one of a plurality of optical ports. This embodiment may be dynamically programmed to demultiplex, multiplex and switch any combination of wavelengths to any of a plurality of optical ports.

The embodiment of the wavelength selective optical switch, detailed in FIG. 7(A), FIG. 7(B), and FIG. 7(C), comprises a Cylindrical Lens Array 703 optically coupled to an Input Fiber 701, an Anamorphic Lens 705, a first Polarization Beam Splitter (PBS) 707, Half-Waveplate (HWP) 709, Littrow Gratings 711 and 713, HWP 715, a second PBS 717, QWP 719, Rotationally Symmetric Lens 721, a Array of Programmable Mirrors 723, a first Output Fiber 701-*a*, and a second Output Fiber 701-*b*. The device of FIG. 7 may be mounted within an enclosure optimized for optical transmission, including a gas-filled enclosure, or the like.

Anamorphic Lens 705 and Rotationally Symmetric Lens 711 may be comprised of multiple lens elements. It is well known in the art that lenses may be comprised of multiple lens elements to achieve a particular optical performance. A prism may optionally be used in any embodiment of the system.

A multi-channel light signal 725 enters the device through the Input Fiber 701, and is directed through one of the Cylindrical Lenses on the Cylindrical Lens Array 703. The Cylindrical Lens on the Cylindrical Lens Array 703 collimates the multi-channel light signal 725 in the x-axis and directs it through the Anamorphic Lens 705. When beam size is large, the geometrical limit holds and all the rays are parallel in a collimated beam. As the beam size decreases, diffraction becomes important and it is preferable to locate the beam waist at the Grating. The Anamorphic Lens 705 collimates and focuses the multi-channel light signal 725 in the y-axis and directs it into the first PBS 707. The PBS separates multi-channel light signal 725 into its s-polarized and p-polarized states.

The s-polarized optical component of Multi-channel light signal 725 reflects off of the Beam Splitting Surface 708 of PBS 707 and exits PBS 707. The s-polarized optical component then diffracts through Littrow Grating 713 and passes though HWP 715 which converts the s-polarization state to a p-polarized state. The p-polarized optical component of Multi-channel light signal 725 transmits through the Beam Splitting Surface 708 of PBS 707, exits PBS 707, and passes though HWP 709 which converts the p-polarization state from p-polarized to s-polarized. This s-polarized light diffracts through Littrow Grating 711.

Grating 711 diffracts the individual Channels 727 and 729 (hereafter channels) of the multi-channel light signal 725 into PBS 717. Grating 713 diffracts the individual channels through HWP 715 which converts the s-polarization state to a p-polarized state.

Both the p-polarized and s-polarized states of the individual channels enter second PBS 717; the s-polarized state reflects off of the Beam Splitting Surface 718 of PBS 717 and exits PBS 717. The p-polarized state transmits through the Beam Splitting Surface 718 of PBS 717, and exits PBS 717 recombined with the s-polarized state.

The individual channels are directed through QWP 719 and through Rotationally Symmetric Lens 721. The Rotationally Symmetric Lens 721 focuses Channels 727 and 729 in both the x-axis and y-axis, near the Programmable Mirror on the Mirror Array 723. More specifically, Rotationally Symmetric Lens 721 focuses Channel 727 near the Programmable Mirror associated with Channel 727, and focuses channel 729 near the Programmable Mirror associated with channel 729. By focusing the channels in both the x-axis and y-axis, the optical beam size is reduced.

Depending upon the programmed state of the Programmable Mirrors, each channel may be switched to any one of the two of Output Fibers 701-*a* or 701-*b*. In this regard, each the channel is reflected back through the device in reverse and is directed toward that appropriate output fiber. In the presently detailed case of FIG. 7, the Programmable Mirrors are programmed so as to switch Channel 727 to Output Fiber 701-*a* and Channel 729 to Output Fiber 701-*b*. The optical configuration is such that the optical signals directed to and entering Output Fibers 701-*a* and 701*b* enter the Output Fibers within the cone of acceptance thereby reducing system loss. It will be clear to one skilled in the art that either Channel 727 or Channel 729 may be switched to either Output Fiber 701-*a* or 701-*b* by simply changing the angle of reflection of the associated Programmable Mirror. In this regard, the system may be scaled to accommodate both a large number of Output Fibers, but also a large number of channels.

It will be clear to one skilled in the art that the system may be operated in the opposite direction. For example, by receiving an optical Channel 727 via Port 701-*a*, multiplexing it with one or more received optical channels, and directing the multiplexed optical signal via Port 701.

A two channel grating-based optical switch, employing one embodiment of the invention, is detailed in FIG. 8(A), FIG. 8(B), FIG. 8(C), and FIG. 8(D). FIG. 8(A), FIG. 8(B), FIG. 8(C), and FIG. 8(D). detail different views of the same device. It is of note that while only two channels are used in this example, a substantially larger number of channels and optical ports may be employed. The wavelength selective optical switch allows for demultiplexing, multiplexing and switching separate optical channels to any one of a plurality of optical ports. The wavelength selective optical switch of FIG. 8 may be dynamically programmed to demultiplex, multiplex and switch any combination of wavelengths to any of a plurality of optical ports.

A first embodiment of the wavelength selective optical switch device of FIG. 8(A), FIG. 8(B), FIG. 8(C), and FIG. 8(D) comprises First Cylindrical Lens Array 803 optically coupled to an Input Fiber 801, a First Anamorphic Lens 805, a First Grating 807, a First Rotationally Symmetric Lens 809, an Array of programmable Transmissive Beam Steerers (TBS) 810, a Second Anamorphic Lens 815, a Second Littrow Grating 817, a Second Anamorphic Lens 815, a Second Cylindrical Lens Array 813, a first Output Fiber 811-*a*, and a second Output Fiber 811-*b*.

The device of FIG. 8 may be mounted within an enclosure optimized for optical transmission, including a gas-filled enclosure, or the like.

The First and Second Cylindrical Lens Arrays 803 and 813, First and Second Anamorphic Lenses 805 and 815, and First and Second Rotationally Symmetric Lenses 809 and 819 may be comprised of multiple lens elements. It is well known in the art that lenses may be comprised of multiple lens elements to achieve a particular optical performance.

The Array of programmable TBS 810 is responsible for steering optical signals. However, other beam steering devices, such as a liquid crystal or the like, may also be employed. It will be clear to one skilled in the art that beam steering devices may be used in any of the described embodiments.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on the First and Second Gratings 807 and 817. When the prism and gratings are properly designed and configured the effects of temperature on the system are greatly reduced. However, some embodiments of the system do not contain a prism.

A multi-channel light signal 821 enters the device through the Input Fiber 801, and is directed through one of the Cylindrical Lenses on the First Cylindrical Lens Array 803. The Cylindrical Lens on the First Cylindrical Lens Array 803 collimates the multi-channel light signal 821 and directs it through the First Anamorphic Lens 805. When beam size is large, the geometrical limit holds and all the rays are parallel in a collimated beam. As the beam size decreases, diffraction becomes important and it is preferable to locate the beam waist at the Grating. The First Anamorphic Lens 805 collimates and focuses the multi-channel light signal 821 and directs it onto First Grating 807. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

First Grating 807 diffracts the individual Channels 823 and 825 of the multi-channel light signal 821 (hereafter channels) towards the First Rotationally Symmetric Lens 809. The First Rotationally Symmetric Lens 809 is preferably telecentric, so that the central ray, or chief ray, of each channel is parallel at the TBS plane. This minimizes the tilt required by the TBS. In a telecentric lens, the aperture stop is located at the front focus of the lens, resulting in the exit pupil being at infinity. The First Rotationally Symmetric Lens 809 focuses the Channels 823 and 825, in both the x-axis and y-axis, near the TBS Array 810. More specifically, Rotationally Symmetric Lens 809 focuses Channel 823 near the Programmable Mirror associated with Channel 823, and focuses channel 825 near the Programmable Mirror associated with channel 825. By focusing the channels in both the x-axis and y-axis, the optical beam size is reduced and the size of the TBS 810 may be reduced.

Depending upon the programmed state of the TBS 810, each channel may be switched to any one of the two of Output Fibers 811-*a* or 811-*b*. In this regard, each the channel is transmitted through the Second Rotationally Symmetric Lens 819 which collimates the channels in both the x-axis and y-axis toward Second Grating 817. Second Grating 817 multiplexes the channels switched to the same output fiber and diffracts the resulting beam toward that output fiber. In the presently detailed case of FIG. 8, TBS 810 is programmed so as to switch Channel 823 to Output Fiber 811-*a* and Channel 825 to Output Fiber 811-*b*. Therefore, Channel 823 is directed by its corresponding beam steerer on TBS 810 through Second Rotationally Symmetric Lens 819 which collimates the Channel towards Second Grating 817. Second Grating 817 diffracts Channel 823 through Second Anamorphic Lens 815. Second Anamorphic Lens 815 focuses Channel 823 toward Second Cylindrical Lens 803, which focuses Channel 823 into Output Fiber 811-*a*. Similarly, Channel 825 is transmitted through Second Rotationally Symmetric Lens 819 which collimates the Channel towards Second Grating 817. Second Grating 817 diffracts Channel 825 through Second Anamorphic Lens 815. Second Anamorphic Lens 815 focuses Channel 825 toward Second Cylindrical Lens 813, which focuses Channel 825 into Output Fiber 811-*b*.

The optical configuration is such that the optical signals directed to and entering Output Fibers 811-*a* and 811*b* enter the Output Fibers within the cone of acceptance thereby reducing system loss. It will be clear to one skilled in the art that either Channel 823 or Channel 825 may be switched to either Output Fiber 811-*a* or 811-*b* by simply changing the angle of direction of the associated TBS. In this regard, the system may be scaled to accommodate both a large number of Output Fibers, but also a large number of channels.

It will be clear to one skilled in the art that the system may be operated in the opposite direction. For example, receiving an optical Channel 813 via Port 811-*a*, multiplexing it with one or more received optical channels, and directing the multiplexed optical signal via Port 801-*a* or 801-*b*.

A two channel grating-based optical switch, employing one embodiment of the invention, is detailed in FIG. 9(A), FIG. 9(B), FIG. 9(C), and FIG. 9D). FIG. (A), FIG. 9(B), FIG. 9(C), and FIG. 9(D) detail different views of the same device. It is of note that while only two channels are used in this example, a substantially larger number of channels and optical ports may be employed. This embodiment allows for demultiplexing, multiplexing and switching separate optical channels to any one of a plurality of optical ports. This embodiment may be dynamically programmed to demultiplex, multiplex and switch any combination of wavelengths to any of a plurality of optical ports.

Figure 9A:
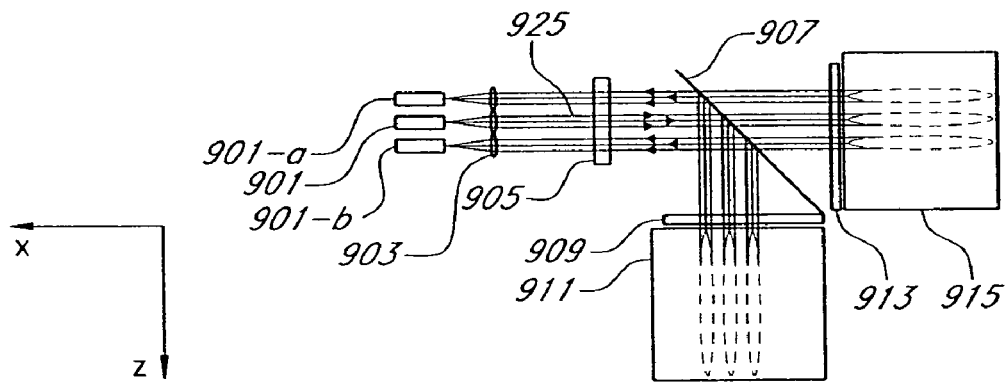
FIG. 9(A) is a perspective view of a seventh embodiment of a wavelength selective optical switch detailing the optical paths through the device.
Figure 9B:
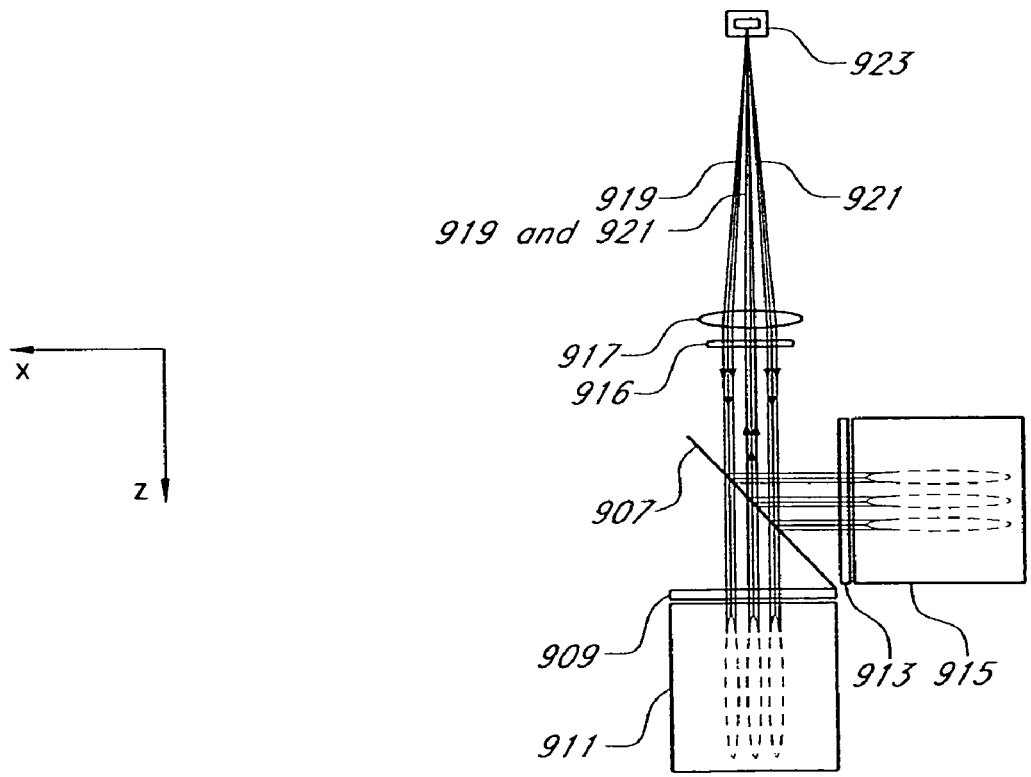
FIG. 9(B) is a perspective view of a seventh embodiment of a wavelength selective optical switch detailing the optical paths through the device.
Figure 9C:
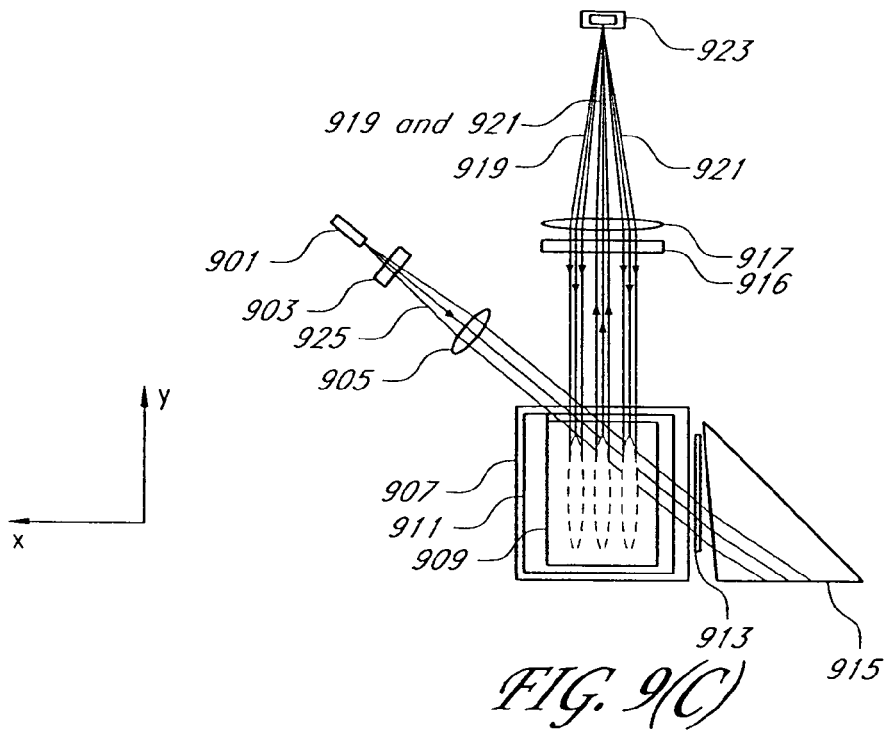
FIG. 9(C) is a perspective view of a seventh embodiment of a wavelength selective optical switch detailing the optical paths through the device.
Figure 9D:
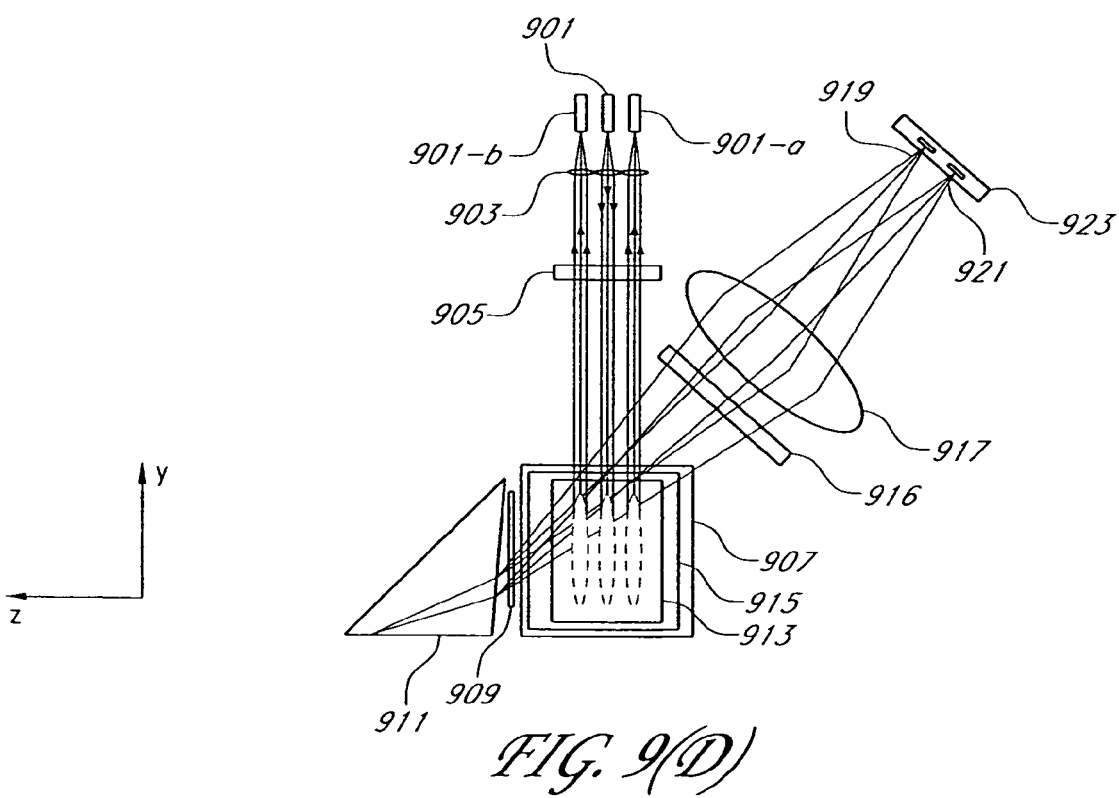
FIG. 9(D) is a perspective view of a seventh embodiment of a wavelength selective optical switch detailing the optical paths through the device.

The embodiment of the wavelength selective optical switch, detailed in FIG. (A), FIG. 9(B), FIG. 9(C), and FIG. 9(D), comprises a Cylindrical Lens Array 903 optically coupled to an Input Fiber 901, an Anamorphic Lens 905, a Polarization Beam Splitter (PBS) 907, Littrow Gratings 911 and 915, Faraday Rotators 909 and 913, QWP 916, Rotationally Symmetric Lens 917, a Array of Programmable Mirrors 923, a first Output Fiber 901-*a*, and a second Output Fiber 901-*b*. The device of FIG. 9 may be mounted within an enclosure optimized for optical transmission, including a gas-filled enclosure, or the like. The cylindrical and anamorphic lenses produce a beam with an elliptical footprint on the grating. The major axis of the ellipse is perpendicular to the grooves so that the spectral resolution is maximized, while the overall size of the grating is less than that if a conventional rotationally symmetric collimating lens were used.

Anamorphic Lens 905 and Rotationally Symmetric Lens 917 may be comprised of multiple lens elements. It is well known in the art that lenses may be comprised of multiple lens elements to achieve a particular optical performance.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on Gratings 911 and 915. Littrow Grating 911 and 915 may be optically coupled to one of the prism's surface. When the prism and Gratings 911 and 915 are properly designed and configured the effects of temperature on the system are greatly reduced. However, some embodiments of the system do not contain a prism.

QWP 916 may also be employed to reduce polarization dependent loss (PDL) in the system. QWP 916 oriented at 45 deg to the grating lines rotates the polarization of light traveling through the QWP so that light that is s-polarized at the grating on the first pass is p-polarized on the second pass. The net result is no polarization dependent loss (PDL) for light traveling between the Input Fiber 901 and any of the Output Fibers 901-*a* and 901-*b*.

A multi-channel light signal 925 enters the device through the Input Fiber 901, and is directed through one of the Cylindrical Lenses on the Cylindrical Lens Array 903. The Cylindrical Lens on the Cylindrical Lens Array 903 collimates the multi-channel light signal 915 in the z-axis and directs it through the Anamorphic Lens 905. When beam size is large, the geometrical limit holds and all the rays are parallel in a collimated beam. As the beam size decreases, diffraction becomes important and it is preferable to locate the beam waist at the Grating. The Anamorphic Lens 905 collimates and focuses the multi-channel light signal 915 in the y-axis and directs it into the PBS 907. The PBS separates multi-channel light signal 925 into its s-polarized and p-polarized states.

Figure 10:
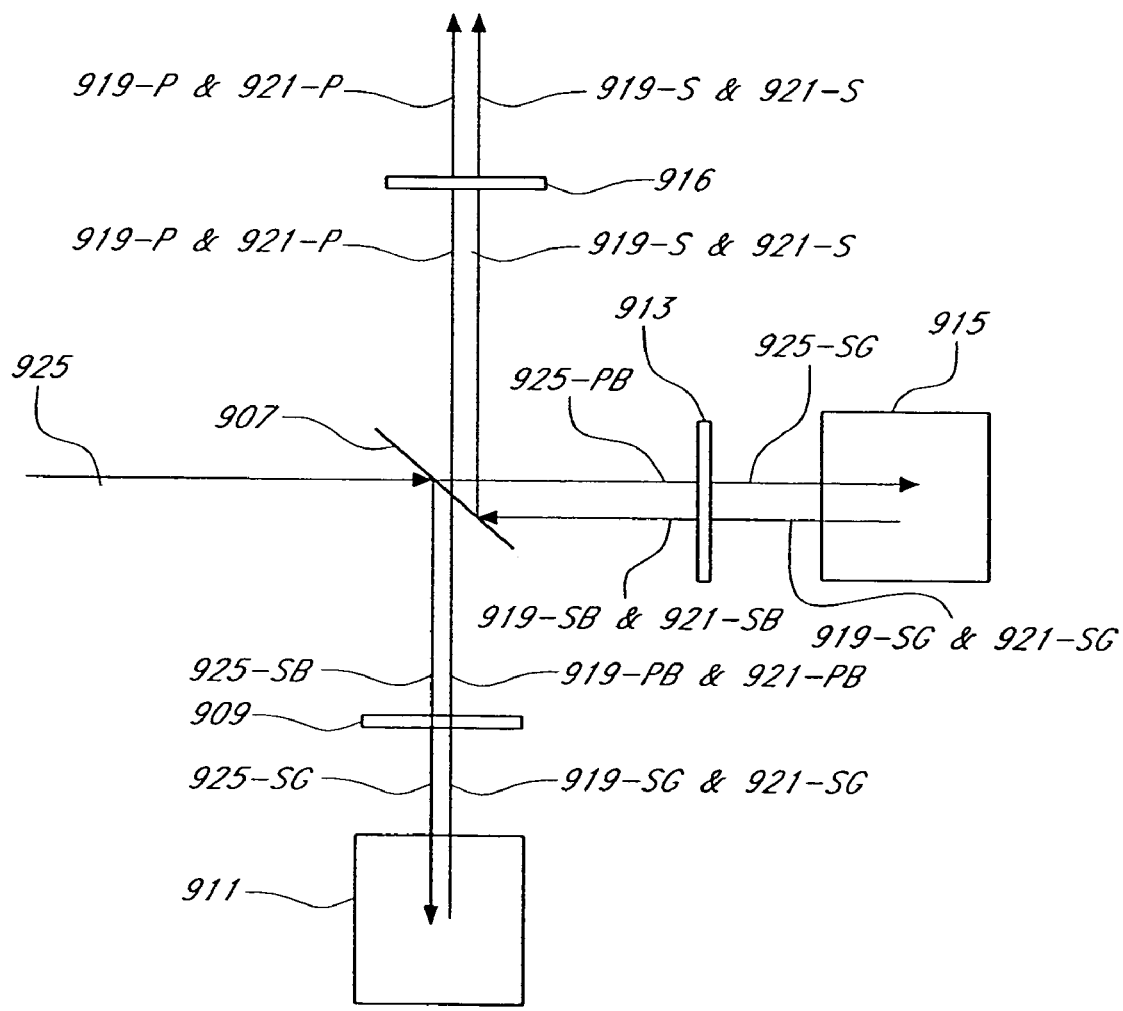
FIG. 10 is a perspective view of a seventh embodiment of a wavelength selective optical switch detailing the optical polarization states at various locations within the device.

Turning briefly to FIG. 10, the polarization states of multi-channel light signal 925 are described in detail. Multi-channel light signal 925 strikes PBS 907 and the s-polarized optical component reflects, while the p-polarized component transmits through PBS 907. The s-polarized component of Multi-channel light signal 925 striking PBS 907 is not parallel to the y-axis, because the micro cylindrical collimators array 901, 901-*a*, and 901-*b* are not in the xy-plane. The s-polarized optical component 925-SB passes through Faraday Rotator (FR) 909, which rotates the polarization state by 45 degrees such that the light 925-SG is s-polarized at the Littrow Grating 911. A Faraday rotator is a non-reciprocal optical device that rotates the polarization plane of both forward and backward transmitted beam in a certain direction, regardless of the transmission direction of the beam. Littrow Grating 911 diffracts the individual channels 919-SG and 921-SG of light back through FR 909 that rotates the light a further 45 degrees so that the light 919-PB and 921-PB is p-polarized in the reference frame of PBS 907. Because individual channels 919-PB and 921-PB are now p-polarized they transmit through PBS surface 907 and exit the PBS 907, passing though QWP 916 that converts the p-polarized light to left circularly polarized light 919-LC and 921-LC.

Preferably, the input beam 925 at the PBS 907, and diffraction gratings 911 and 915 are oriented such that the s-p coordinates at the grating are rotated by 45 degrees from the s-p coordinates at the gratings. For example, in one embodiment, the incident beam makes a 51 degree angle with the y-axis and is in the y-z plane and the PBS is rotated by 38 degrees around the y-axis by 38 degrees. One skilled in the art will recognize that many orientations of the incident beams 925, PBS, and diffraction grating are possible.

In much the same fashion as described above with the s-polarized optical component, the p-polarized optical component 925-PB transmits through PBS 907 and passes though FR 913 which rotates the polarization state from p-polarized in the reference frame of the PBS to s-polarized in the reference frame of the grating, and illuminates Littrow Grating 911. Littrow Grating 911 diffracts the individual channels of light back through FR 913 that converts their polarization to an s-polarized state in the reference frame of PBS 907, and into PBS 909. The s-polarized optical component 919-SB and 921-SB reflects off of PBS 907, passing though QWP 916 that converts the s-polarized light to right circularly polarized light 919-RC and 921-RC Turning again to FIG. 9(A), FIG. 9(B), FIG. 9(C), and FIG. 9(D), Gratings 911 and 915 diffracts the individual Channels 919 and 921 of the multi-channel light signal 925 (hereafter channels) through PBS 907, QWP 916, and towards Rotationally Symmetric Lens 917. The Rotationally Symmetric Lens 917 is preferably telecentric, so that the central ray, or chief ray, of each channel is parallel at the mirrors plane. This minimizes the tilt required by the MEMS mirrors. In a telecentric lens, the aperture stop is located at the front focus of the lens, resulting in the exit pupil being at infinity. The Rotationally Symmetric Lens 917 focuses Channels 919 and 921 in both the x-axis and y'-axis (not shown), near the Programmable Mirror on the Mirror Array 923. More specifically, Rotationally Symmetric Lens 917 focuses Channel 919 near the Programmable Mirror associated with Channel 919, and focuses channel 921 near the Programmable Mirror associated with channel 921. By focusing the channels in both the x-axis and y'-axis (not shown), the optical beam size is reduced.

Depending upon the programmed state of the Programmable Mirrors, each channel may be switched to any one of the two of Output Fibers 901-*a* or 901-*b*. In this regard, each the channel is reflected back through the Rotationally Symmetric Lens 917 which collimates the channels in both the x-axis and y'-axis (not shown) and directs the channels through PBS 907 and onto Gratings 911 and 913. Gratings 911 and 913 multiplex the channels switched to the same output fiber and diffracts the resulting beam toward that output fiber. In the presently detailed case of FIG. 9, the Programmable Mirrors are programmed so as to switch Channel 919 to Output Fiber 901-*a* and Channel 921 to Output Fiber 901-*b*.

The optical configuration is such that the optical signals directed to and entering Output Fibers 901-*a* and 901-*b* enter the Output Fibers within the cone of acceptance thereby reducing system loss. It will be clear to one skilled in the art that either Channel 919 or Channel 921 may be switched to either Output Fiber 901-*a* or 901-*b* by simply changing the angle of reflection of the associated Programmable Mirror. In this regard, the system may be scaled to accommodate both a large number of Output Fibers, but also a large number of channels.

It will be clear to one skilled in the art that the system may be operated in the opposite direction. For example, by receiving an optical Channel 927 via Port 901-*a*, multiplexing it with one or more received optical channels, and directing the multiplexed optical signal via Port 901.

What is claimed is:

1. A wavelength selective switch configured to couple with a plurality of ports, the switch comprising:
    non-rotationally symmetric optics positioned to receive light from a first of the plurality of ports, said optics configured to produce a substantially collimated non-rotationally symmetric beam;
    a diffraction grating positioned to receive the beam from said optics;
    a lens positioned to receive at least a portion of the beam from said diffraction grating; and
    a beam director array positioned to receive said at least a portion of the beam from said lens, said beam director array configured to direct said at least a portion of the beam through said lens to said diffraction grating, and from said diffraction grating through said non-rotationally symmetric optics.

2. The wavelength selective switch of claim 1, wherein said non-rotationally symmetric optics comprises an anamorphic lens.

3. The wavelength selective switch of claim 1, wherein said non-rotationally symmetric optics comprises a cylindrical lens.

4. The wavelength selective switch of claim 1, wherein said non-rotationally symmetric optics comprises a cylindrical lens and an anamorphic lens.

5. The wavelength selective switch of claim 1, wherein the non-rotationally symmetric beam has a cross-section transverse to the direction of propagation of the beam having the shape of an ellipse, said ellipse having major and minor axes.

6. The wavelength selective switch of claim 5, wherein said diffraction grating comprises a plurality of grooves, each groove of said plurality of grooves being elongated along a first direction, said major axis of said ellipse oriented along a second direction that is substantially perpendicular to the first direction along which said plurality of grooves is elongated.

7. The wavelength selective switch of claim 1, wherein said optics and said diffraction grating define an optical path therebetween, said non-rotationally symmetric beam being elongated along a direction perpendicular to said optical path between said optics and said diffraction grating.

8. The wavelength selective switch of claim 1, wherein said diffraction grating operates at Littrow.

9. The wavelength selective switch of claim 1, wherein said lens is rotationally symmetric.

10. The wavelength selective switch of claim 1, wherein said beam director array is programmable among a plurality of states.

11. The wavelength selective switch of claim 1, wherein said beam director array directs said at least a portion of the beam to a second of the plurality of ports when in one state, and directs said at least a portion of the beam to a third of the plurality of ports when in another state.

12. The wavelength selective switch of claim 1, wherein said beam director array is electrically programmable.

13. The wavelength selective switch of claim 1, wherein said beam director array comprises a MEMS mirror.

14. The wavelength selective switch of claim 1, wherein said non-rotationally symmetric beam is substantially collimated along a first axis and a second axis.

15. The wavelength selective switch of claim 1, wherein said non-rotationally symmetric beam is elongated along said first axis.

16. The wavelength selective switch of claim 1, wherein said first axis is perpendicular to said second axis.

17. The wavelength selective switch of claim 1, wherein said first axis is a major axis and said second axis is a minor axis.

18. The wavelength selective switch of claim 1, wherein said beam defines an ellipse.

* * * * *

UNITED STATES PATENT AND TRADEMARK OFFICE
CERTIFICATE OF CORRECTION

| | |
|---|---|
| PATENT NO. | : 7,330,615 B2 |
| APPLICATION NO. | : 11/646864 |
| DATED | : February 12, 2008 |
| INVENTOR(S) | : James P. McGuire, Jr. |

It is certified that error appears in the above-identified patent and that said Letters Patent is hereby corrected as shown below:

In Column 4, line 39, After "Where" delete "A" and insert -- $\lambda$ --, therefor.

In Column 11, line 21, After "Cassarly" delete "et-al" and insert -- et al., --, therefor.

In Column 12, line 49, After "101-a and" delete "101b", and insert -- 101-b --, therefor.

In Column 13, lines 13-14, After "yrttrium orthovandate" delete "(YV04)" and insert -- (YVO4) --, therefor.

In Column 14, line 59, After "FIG." delete "4.," and insert -- 4, --, therefor.

In Column 15, line 54, After "301-a and" delete "301b", and insert -- 301-b --, therefor.

In Column 17, line 45, After "501-a and" delete "501b", and insert -- 501-b --, therefor.

In Column 21, line 41, After "601-a and" delete "601b", and insert -- 601-b --, therefor.

In Column 23, line 4, After "701-a and" delete "701b", and insert -- 701-b --, therefor.

In Column 25, line 13, After "and FIG." delete "9D)" and insert -- 9(D) --, therefor.

In Column 25, line 13, "FIG. (A)" should be -- FIG. 9(A) --.

UNITED STATES PATENT AND TRADEMARK OFFICE
CERTIFICATE OF CORRECTION

| | |
|---|---|
| PATENT NO. | : 7,330,615 B2 |
| APPLICATION NO. | : 11/646864 |
| DATED | : February 12, 2008 |
| INVENTOR(S) | : James P. McGuire, Jr. |

It is certified that error appears in the above-identified patent and that said Letters Patent is hereby corrected as shown below:

In Column 25, line 24, "FIG. (A)" should be -- FIG. 9(A) --.

Signed and Sealed this

Fourth Day of August, 2009

JOHN DOLL
*Acting Director of the United States Patent and Trademark Office*